US011838229B2

(12) United States Patent
Damnjanovic et al.

(10) Patent No.: US 11,838,229 B2
(45) Date of Patent: Dec. 5, 2023

(54) ENHANCED ULTRA-RELIABLE/LOW-LATENCY COMMUNICATIONS OVER-THE-AIR MECHANISM FOR SHARED SPECTRUM

(71) Applicant: QUALCOMM Incorporated, San Diego, CA (US)

(72) Inventors: Aleksandar Damnjanovic, Del Mar, CA (US); Andrei Dragos Radulescu, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 17/071,635

(22) Filed: Oct. 15, 2020

(65) Prior Publication Data

US 2021/0119748 A1 Apr. 22, 2021

Related U.S. Application Data

(60) Provisional application No. 62/916,582, filed on Oct. 17, 2019.

(51) Int. Cl.
*H04L 5/00* (2006.01)
*H04W 24/10* (2009.01)
(Continued)

(52) U.S. Cl.
CPC .......... *H04L 5/0048* (2013.01); *H04W 24/10* (2013.01); *H04W 72/541* (2023.01)

(58) Field of Classification Search
None
See application file for complete search history.

(56) References Cited

U.S. PATENT DOCUMENTS

2013/0176874 A1* 7/2013 Xu ............... H04W 52/242
370/252
2014/0295907 A1* 10/2014 Luo ............... H04W 24/02
455/522

(Continued)

FOREIGN PATENT DOCUMENTS

EP 2991413 A1 3/2016

OTHER PUBLICATIONS

International Search Report and Written Opinion—PCT/US2020/056021—ISA/EPO—dated Jan. 25, 2021.

*Primary Examiner* — Scott M Sciacca
(74) *Attorney, Agent, or Firm* — Holland & Hart LLP/Qualcomm Incorporated

(57) ABSTRACT

Methods, systems, and devices for wireless communications are described. A user equipment (UE) may receive, from a base station serving the UE in a first network, a power control configuration and a reference signal measurement configuration. The UE may receive, based at least in part on the reference signal measurement configuration, a reference signal from at least one wireless device of a second network. The UE may determine, based at least in part on the power control configuration and the received reference signal, an interference level for the second network introduced by the first network. The UE may adjust a transmission power limit for the UE based at least in part on the determined interference level and the power control configuration. The UE may transmit signals to the base station according to the adjusted transmission power limit.

28 Claims, 20 Drawing Sheets

(51) Int. Cl.
*H04W 52/24* (2009.01)
*H04W 72/541* (2023.01)

(56) References Cited

U.S. PATENT DOCUMENTS

| | | |
|---|---|---|
| 2015/0181546 A1 | 6/2015 | Freda et al. |
| 2017/0188314 A1 | 6/2017 | Mueck et al. |
| 2018/0167848 A1* | 6/2018 | Lei .................... H04W 72/0453 |
| 2018/0249449 A1* | 8/2018 | Hwang ............... H04W 72/042 |
| 2019/0110335 A1* | 4/2019 | Zhang .................... H04J 11/005 |
| 2019/0174423 A1 | 6/2019 | Zhang et al. |
| 2020/0053661 A1* | 2/2020 | Yang .................... H04W 72/10 |
| 2021/0112503 A1* | 4/2021 | Zhang .................. H04B 17/345 |

* cited by examiner

ENHANCED ULTRA-RELIABLE/LOW-LATENCY COMMUNICATIONS OVER-THE-AIR MECHANISM FOR SHARED SPECTRUM

CROSS REFERENCE

The present Application for Patent claims the benefit of U.S. Provisional Patent Application No. 62/916,582 by DAMNJANOVIC et al., entitled "ENHANCED ULTRA-RELIABLE/LOW-LATENCY COMMUNICATIONS OVER-THE-AIR MECHANISM FOR SHARED SPECTRUM," filed Oct. 17, 2019, assigned to the assignee hereof, and expressly incorporated by reference herein.

BACKGROUND

The following relates generally to wireless communications, and more specifically to enhanced ultra-reliable/low-latency communications (eURLLC) over-the-air mechanism for shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support enhanced ultra-reliable/low-latency communications (eURLLC) over-the-air mechanism for shared spectrum. Generally, the described techniques provide various mechanisms that support wireless communications in a wireless network. Broadly, aspects of the described techniques improve a user equipment (UE) and/or a base station in a first network being able to independently adjust their transmit power levels based on detecting a wireless device (e.g., UE and/or base station) in a neighboring network (e.g., a second network). The second network may be a higher priority network, may share the spectrum with the first network, may be deployed in an overlapping coverage area manner, and the like. Accordingly, a network device of the first network (e.g., the serving base station of the UE and/or a network entity via the serving base station) may identify or otherwise determine that the second network associated with a higher priority level is operating nearby (e.g., within a defined geographic area). In response, the UE operating in the first network may receive a signal from its serving base station (e.g., the network device) carrying or otherwise conveying an indication of a power control configuration and a reference signal measurement configuration. The power control configuration may identify an initial transmission power limit for the UE and/or identify a threshold interference level that can be supported by the second network. The reference signal measurement configuration may identify a reference signal transmission configuration for the UE and/or identify a reference signal transmission configuration for wireless devices operating in the second network. The UE may use the reference signal transmission configuration to receive reference signals from one or more wireless devices operating in the second network. The reference signals may be transmissions from one or more UEs and/or base stations from the second network. The UE may use the received reference signals to determine an interference level for the second network that would be introduced by the first network (e.g., interference introduced into the second network by transmissions from the UE). For example, the UE may calculate, identify, or otherwise determine the amount of interference that would be introduced into the second network based on UE transmissions using the initial transmission power level (e.g., as configured by the power control configuration). The UE may then adjust its transmission power limit (e.g., power spectral density (PSD)) based on the amount of interference that will introduced into the second network by UE transmissions. The UE may then use the adjusted transmission power limit to perform wireless transmissions in the first network. The UE may transmit a signal to the serving base station identifying its adjusted transmission power limit.

A method of wireless communication at a UE is described. The method may include receiving, from a base station serving the UE in a first network, a power control configuration and a reference signal measurement configuration, receiving, based on the reference signal measurement configuration, a reference signal from at least one wireless device of a second network, determining, based on the power control configuration and the received reference signal, an interference level for the second network introduced by the first network, adjusting a transmission power limit for the UE based on the determined interference level and the power control configuration, and transmitting signals to the base station according to the adjusted transmission power limit.

An apparatus for wireless communication at a UE is described. The apparatus may include a processor, memory coupled with the processor, and instructions stored in the memory. The instructions may be executable by the processor to cause the apparatus to receive, from a base station serving the UE in a first network, a power control configuration and a reference signal measurement configuration, receive, based on the reference signal measurement configuration, a reference signal from at least one wireless device of a second network, determine, based on the power control configuration and the received reference signal, an interference level for the second network introduced by the first network, adjust a transmission power limit for the UE based on the determined interference level and the power control configuration, and transmit signals to the base station according to the adjusted transmission power limit.

Another apparatus for wireless communication at a UE is described. The apparatus may include means for receiving, from a base station serving the UE in a first network, a power control configuration and a reference signal measurement configuration, receiving, based on the reference signal measurement configuration, a reference signal from at least one wireless device of a second network, determining, based on the power control configuration and the received reference signal, an interference level for the second network introduced by the first network, adjusting a transmission power limit for the UE based on the determined interference level and the power control configuration, and transmitting signals to the base station according to the adjusted transmission power limit.

A non-transitory computer-readable medium storing code for wireless communication at a UE is described. The code may include instructions executable by a processor to receive, from a base station serving the UE in a first network, a power control configuration and a reference signal measurement configuration, receive, based on the reference signal measurement configuration, a reference signal from at least one wireless device of a second network, determine, based on the power control configuration and the received reference signal, an interference level for the second network introduced by the first network, adjust a transmission power limit for the UE based on the determined interference level and the power control configuration, and transmit signals to the base station according to the adjusted transmission power limit.

In some examples of the method, apparatuses, and non-transitory computer-readable medium described herein, determining the interference level may include operations, features, means, or instructions for determining, based on the received reference signal, an amount of interference to the second network that would be caused by transmissions from the UE according to the power control configuration, where the power control configuration includes an initial transmission power limit of the UE, and adjusting the initial transmission power limit of the UE based on the amount of interference that would be caused to the second network, where the adjusted transmission power limit of the UE maintains the amount of interference that would be caused to the second network to below a threshold interference level supported by the second network.

Some examples of the method, apparatuses, and non-transitory computer-readable medium described herein may further include operations, features, means, or instructions for determining that the second network may have a higher network priority level than the first network, where adjusting the transmission power limit for the UE may be further based on the second network having the higher network priority level.

Some examples of the method, apparatuses, and non-transitory computer-readable medium described herein may further include operations, features, means, or instructions for detecting the reference signal from the at least one of the wireless devices of the second network on at least one of a same subcarrier or on an adjacent subcarrier as a subcarrier of the first network.

Some examples of the method, apparatuses, and non-transitory computer-readable medium described herein may further include operations, features, means, or instructions for detecting, based on the reference signal measurement configuration, the reference signal during a first reference signal transmission window configured for the second network.

Some examples of the method, apparatuses, and non-transitory computer-readable medium described herein may further include operations, features, means, or instructions for determining that at least one of the first network, the second network, or a combination thereof, include an asynchronous network, where adjusting the transmission power limit for the UE may be further based on the asynchronous network.

Some examples of the method, apparatuses, and non-transitory computer-readable medium described herein may further include operations, features, means, or instructions for transmitting an indication of the adjusted transmission power limit to the base station serving the UE.

In some examples of the method, apparatuses, and non-transitory computer-readable medium described herein, the first network and the second network may be associated with a same network operator.

In some examples of the method, apparatuses, and non-transitory computer-readable medium described herein, the first network and the second network may be associated with different network operators.

In some examples of the method, apparatuses, and non-transitory computer-readable medium described herein, the at least one wireless device includes a neighbor UE associated with the second network or a neighbor base station associated with the second network.

In some examples of the method, apparatuses, and non-transitory computer-readable medium described herein, the reference signal includes a sounding reference signal or a synchronization signal block.

In some examples of the method, apparatuses, and non-transitory computer-readable medium described herein, the transmission power limit includes a power spectral density limit for the first network.

A method of wireless communication at a network device associated with a first network is described. The method may include identifying a second network that is associated with a priority level higher than the first network, transmitting, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network, and receiving a measurement report from the UE based on the reference signal measurement configuration.

An apparatus for wireless communication at a network device associated with a first network is described. The apparatus may include a processor, memory coupled with the processor, and instructions stored in the memory. The instructions may be executable by the processor to cause the apparatus to identify a second network that is associated with a priority level higher than the first network, transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network, and receive a measurement report from the UE based on the reference signal measurement configuration.

Another apparatus for wireless communication at a network device associated with a first network is described. The apparatus may include means for identifying a second network that is associated with a priority level higher than the first network, transmitting, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network, and receiving a measurement report from the UE based on the reference signal measurement configuration.

A non-transitory computer-readable medium storing code for wireless communication at a network device associated with a first network is described. The code may include instructions executable by a processor to identify a second network that is associated with a priority level higher than the first network, transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network, and receive a measurement report from the UE based on the reference signal measurement configuration.

Some examples of the method, apparatuses, and non-transitory computer-readable medium described herein may further include operations, features, means, or instructions for receiving, based on the reference signal measurement configuration, a reference signal from at least one of the wireless devices of the second network, determining, based on the power control configuration and the received reference signal, an interference level for the second network introduced by the first network, adjusting a transmission power limit of the base station based on the determined interference level, and transmitting signals to the UE according to the adjusted transmission power limit.

Some examples of the method, apparatuses, and non-transitory computer-readable medium described herein may further include operations, features, means, or instructions for determining that at least one of the first network, the second network, or a combination thereof, include a synchronous network, determining that resources configured for the second network may be unused, and allocating, based on the synchronous network and the unused resources, the resources for use in the first network.

Some examples of the method, apparatuses, and non-transitory computer-readable medium described herein may further include operations, features, means, or instructions for determining that the second network may be deployed in a geographic area within a threshold range of a coverage area of the first network, where identifying the second network may be based on the determining.

Some examples of the method, apparatuses, and non-transitory computer-readable medium described herein may further include operations, features, means, or instructions for receiving an indication of an adjusted transmission power limit from the UE.

In some examples of the method, apparatuses, and non-transitory computer-readable medium described herein, the first network and the second network may be associated with a same network operator.

In some examples of the method, apparatuses, and non-transitory computer-readable medium described herein, the first network and the second network may be associated with different network operators.

DETAILED DESCRIPTION

Figure 1:
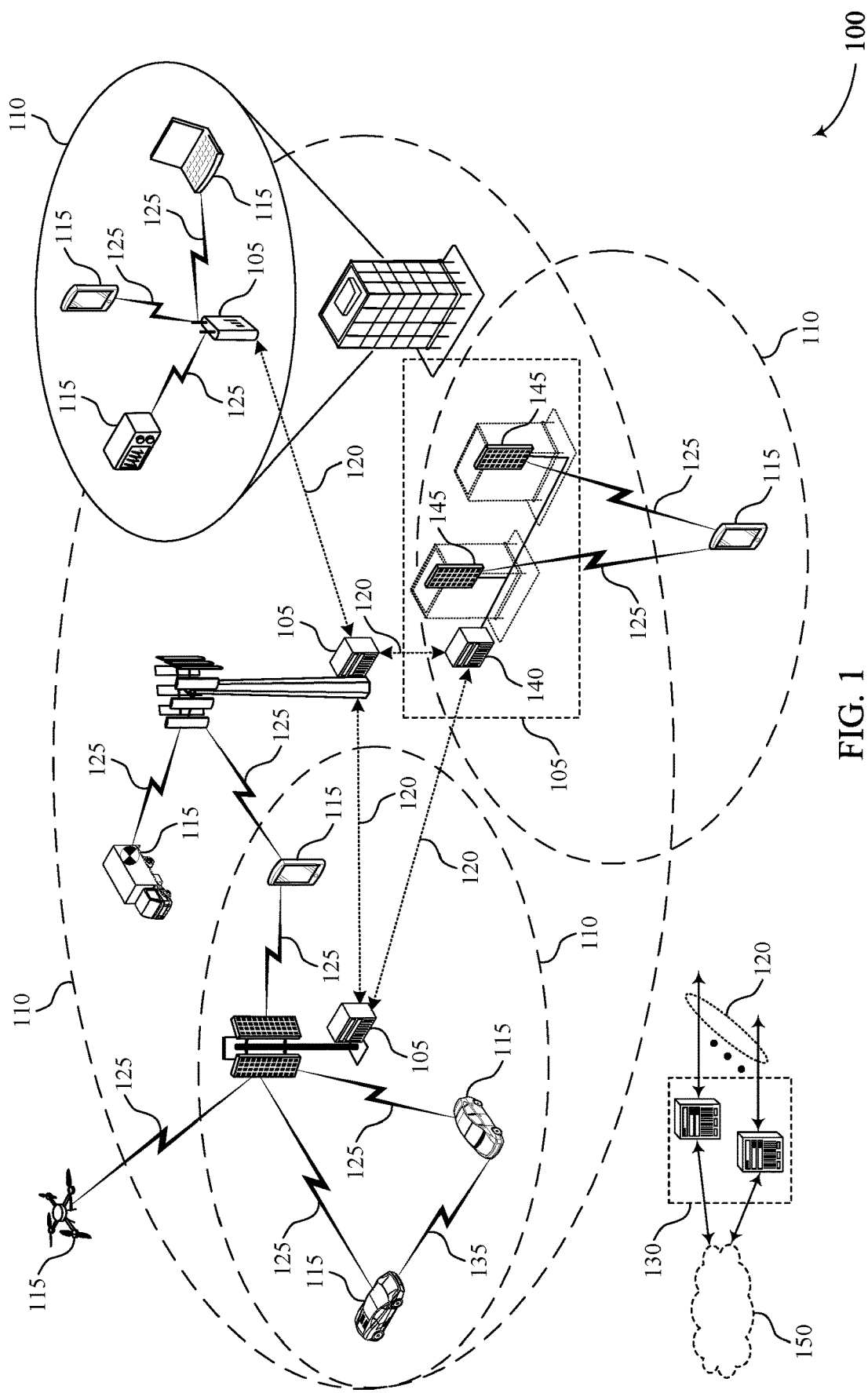
FIG. 1 illustrates an example of a system for wireless communications that supports enhanced ultra-reliable/low-latency communications (eURLLC) over-the-air mechanism for shared spectrum in accordance with aspects of the present disclosure.

Wireless networks may be deployed in an overlapping manner. For example, certain traffic types (e.g., enhanced ultra-reliable/low-latency communications (eURLLC)) may be associated with higher priority communications that require dedicated resources. The demand for such higher priority traffic may generally be localized, leading to a two-tier model where a local licensee (which can be considered a second network in this example) has priority for the spectrum use within a designated area. The spectrum use outside of the designated area can be used by another licensee (e.g., a local or regional network operator, which can be considered a first network in this example). A baseline approach to address this spectrum sharing in overlapping networks is to use a database (referred to as a coexistence manager (CxM)) to manage the local licenses and the coexistence of the license holders. However, this database approach presents certain issues. For example, the database approach requires precise network location information and accurate channel models. This may be difficult due to location uncertainty (e.g., based on UE mobility) and channel model inaccuracy (e.g., rapidly changing channel conditions). This can lead to interference between the two networks, which may have a critical impact on the network's ability to provide the higher priority traffic (e.g. the eURLLC service).

Aspects of the disclosure are initially described in the context of a wireless communications system. Generally, aspects of the described techniques provide various mechanisms that support wireless communications in a wireless network. Broadly, aspects of the described techniques improve a UE and/or a base station in a first network being able to independently adjust their transmit power levels based on detecting a wireless device (e.g., UE and/or base station) in a neighboring network (e.g., a second network). The second network may be a higher priority network, may share the spectrum with the first network, and the like. Accordingly, a network device of the first network (e.g., the serving base station of the UE and/or a network entity via and/or in coordination with the serving base station) may identify or otherwise determine that the second network associated with the higher priority level is operating nearby (e.g., within a defined geographic area). In response, the UE operating in the first network may receive a signal from its serving base station (e.g., the network device) carrying or otherwise conveying an indication of a power control configuration and a reference signal measurement configuration. The power control configuration may identify an initial transmission power limit for the UE and/or identify a threshold interference level that can be supported by the second network. The reference signal measurement configuration may identify a reference signal transmission configuration for the UE and/or identify a reference signal transmission configuration for wireless devices operating in the second network. The UE may use the reference signal transmission configuration to receive reference signals from wireless devices operating in the second network. The reference signals may be transmission from UEs and/or base stations from the second network. The UE may use the received reference signals to determine an interference level for the second network that would be introduced by the first network (e.g., transmissions from the UE). For example, the UE may calculate, identify, or otherwise determine the amount of interference that would be introduced into the second network based on UE transmissions using the initial transmission power level (e.g., as configured by the power control configuration). The UE may then adjust its transmission power limit (e.g., power spectral density (PSD)) based on the amount of interference that will be introduced into the second network by UE transmissions. The UE may then use the adjusted transmission power limit to perform wireless transmissions in the first network. The UE may report its adjusted transmission power limit to its serving base station in the first network.

Aspects of the disclosure are further illustrated by and described with reference to apparatus diagrams, system diagrams, and flowcharts that relate to eURLLC over-the-air mechanism for shared spectrum.

FIG. 1 illustrates an example of a wireless communications system 100 that supports eURLLC over-the-air mechanism for shared spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (in other words, directly between base stations 105), or indirectly (in other words, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology, such as LTE, LTE-A, LTE-A Pro, or NR. Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications, such as in an FDD mode, or may be configured to carry downlink and uplink communications, such as in a TDD mode.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band or a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. The symbol period and subcarrier spacing may be inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds. $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region, such as a control resource set (CORESET), for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions, such as mission critical functions. Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device, such as a base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback. For same-slot HARQ feedback, the device may provide HARQ feedback in a specific slot for data received in a previous symbol in the slot. In other examples, the device may provide HARQ feedback in a subsequent slot, or according to some other time interval.

A base station 105 in the wireless communications system 100 may communicate with one or more UEs 115 using multicast transmissions. A multicast transmission by a base station 105 may be a single transmission (for example, a single message or packet) to a group of multiple UEs 115, for example in a multicast communication channel. The one or more UEs 115 may receive the multicast messaging by monitoring particular channels for multicast messages.

A broadcast transmission may by a base station 105 may be a single transmission to multiple UEs 115 without being addressed or otherwise directed to a particular group of UEs 115. The broadcast transmissions may be sent on a multicast communication channel in some cases, together with, or instead of, multicast transmissions. In some examples, the techniques described herein for multicast transmissions may be applied to broadcast transmissions, for example broadcast transmissions sent on a multicast channel.

A UE 115 may receive, from a base station 105 serving the UE 115 in a first network, a power control configuration and a reference signal measurement configuration. The UE 115 may receive, based at least in part on the reference signal measurement configuration, a reference signal from at least one wireless device of a second network. The UE 115 may determine, based at least in part on the power control configuration and the received reference signal, an interference level for the second network introduced by the first network. The UE 115 may adjust a transmission power limit for the UE 115 based at least in part on the determined interference level and the power control configuration. The UE 115 may transmit signals to the base station according to the adjusted transmission power limit.

A base station 105 (which may also be referred to as a network device, either alone or in coordination with a CxM) may identify a second network that is associated with a priority level higher than the first network. The base station 105 may transmit, to a UE 115 served by the base station 105 in the first network, a power control configuration identifying a transmission power limit for the UE 115 to use to maintain an interference level for the second network introduced by the first network below a threshold interference level supported by the second network and a reference signal measurement configuration for the UE 115 to measure reference signal transmissions from at least one wireless device in the second network. The base station 105 may receive a measurement report from the UE 115 based at least in part on the reference signal measurement configuration.

Figure 2:
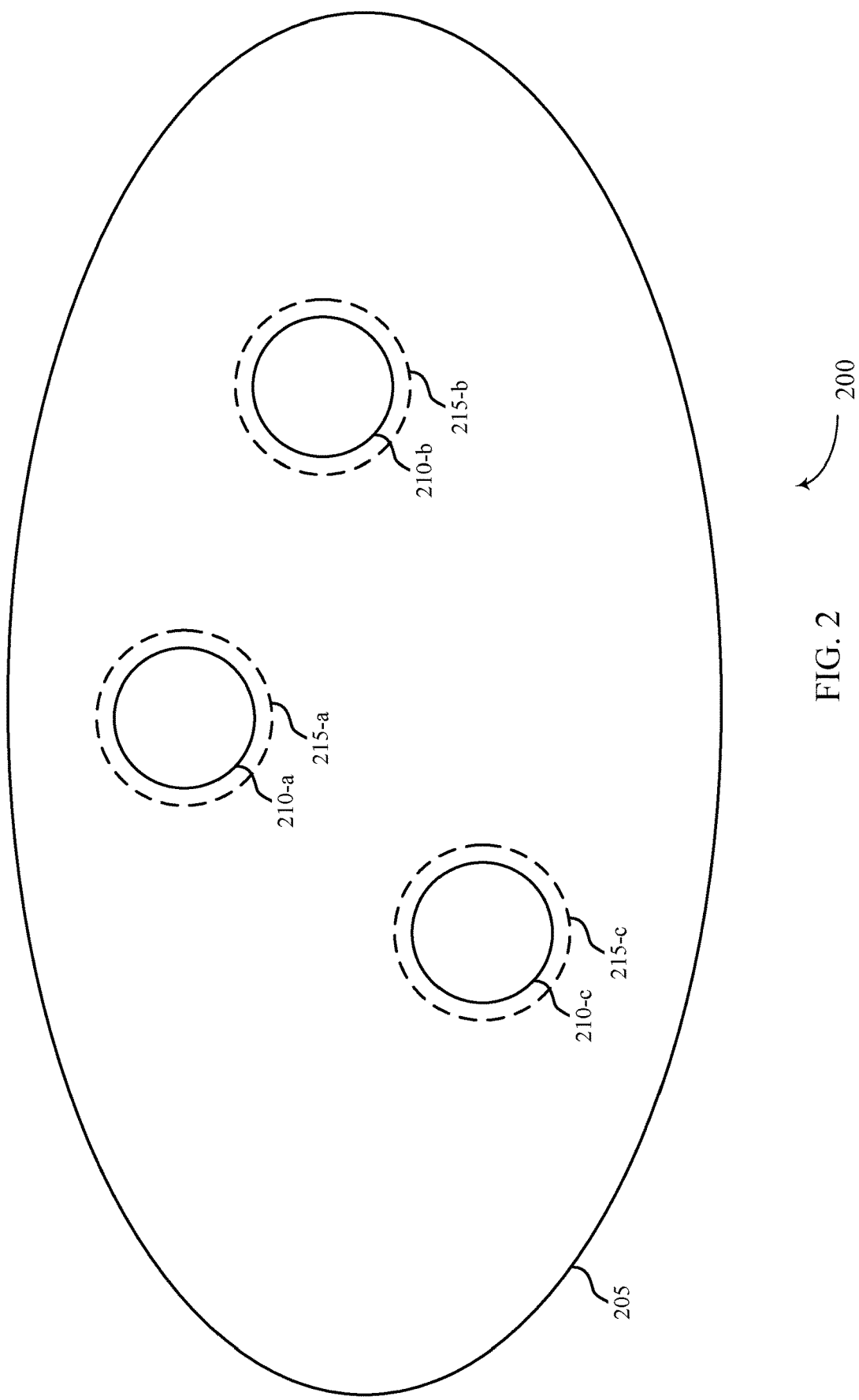
FIG. 2 illustrates an example of a wireless communication system that supports eURLLC over-the-air mechanism for shared spectrum in accordance with aspects of the present disclosure.

FIG. 2 illustrates an example of a wireless communication system 200 that supports eURLLC over-the-air mechanism for shared spectrum in accordance with aspects of the present disclosure. In some examples, wireless communication system 200 may implement aspects of wireless communication system 100. Wireless communication system 200 may include a first coverage area 205 corresponding to a first network and second coverage areas 210 corresponding to a second network, with three second network coverage areas 210 being shown by way of example only. Broadly, each of the first network and second networks may be wireless networks including one or more base stations performing wireless communications with UEs located within the respective networks, which may be examples of the corresponding devices described herein.

Wireless networks may be deployed in an overlapping manner. For example, certain traffic types (e.g., eURLLC) may be associated with higher priority communications that require dedicated resources. The demand for such higher priority traffic may generally be localized, leading to a two-tier model where a local licensee (which can be considered the second networks in this example) has priority for the spectrum use within a designated area, such as the corresponding coverage areas 210 of the second networks. The spectrum use outside of the designated area can be used by another licensee (e.g., a local or regional network operator, which can be considered the first network in this example). A baseline approach to address this spectrum sharing in overlapping networks is to use a database (e.g., CxM) to manage the local licenses and the coexistence of the license holders. However, this database approach presents certain issues. For example, the database approach requires precise network location information and accurate channel models. This may be difficult due to location uncertainty (e.g., based on UE mobility) and channel model inaccuracy (e.g., rapidly changing channel conditions). This can lead to interference between the two networks, which may have a critical impact on the network's ability to provide the higher priority traffic (e.g. the eURLLC service).

In some aspects, a network device (e.g., a base station and/or the base station in coordination with the CxM) may detect, identify, or otherwise determine that one or more of the second networks are deployed. The network device may identify the second network based on the second network having a higher priority level than the first network and/or based on the second coverage area 210 overlapping the first coverage area 205 of the first network, at least to some degree. In the example illustrated in FIG. 2, the network device may identify the second network based on the second networks being deployed within the coverage area 205 of the first network.

The first network and the second network may be associated with different priority levels. As one non-limiting example, the first network corresponding to the first coverage area 205 may be associated with an LTE network, an LTE-A network, an LTE-A Pro network, a NR network, and the like. In one non-limiting example, the first network corresponding to the first coverage area 205 may be associated with an eMBB network (e.g., associated with a local or regional operator). Broadly, the second networks corresponding to the second coverage areas 210 may be associated with any wireless network having a higher priority level than the first network. In one non-limiting example, the second network corresponding to the second coverage areas 210 may be associated with an eURLLC network.

In some aspects, the first network and the second network may operate according to a shared spectrum. For example, the wireless transmissions by wireless devices in the first network may utilize the same and/or adjacent subcarriers in a shared radio frequency spectrum band. In some aspects, the CxM may facilitate aspects of efficient shared spectrum deployment of the second networks (e.g., eURLLC networks, for factory automation, industrial IoT (IIoT) deployments, and the like) and the first network (e.g., an eMBB network, such as may be deployed by a local or regional network operator).

Broadly, the second networks (e.g., an IIoT network supporting eURLLC traffic) cannot tolerate interference from other networks, such as the first network. That is, the resources assigned to the wireless devices communicating in the second network need to be interference free. The second networks may specify a maximum or target interference/noise (I/N) value that the second network (e.g., the IIoT network) can tolerate. Broadly, the target I/N value the second networks can tolerate may correspond to the threshold interference level supported by the second networks. To support this, an over-the-air (OTA) mechanism may be used to detect the presence of other networks (e.g., the OTA mechanism may be used by wireless devices in the second networks to detect the presence of the wireless devices in the first network, and vice versa). For example, the CxM may configure reference signals, which may include SSBs, SRS, channel state information reference signal(s) (CSI-RS)(s), and the like, which may be suitable for the detection of the presence of other networks (e.g., base stations and associated UEs operating in the adjacent networks). For example, each network may be assigned an SRS and/or SSB configuration (e.g., a reference signal measurement configuration) that identifies its presence. The SRS and/or SSB configuration may support multiplexing techniques for reference signal transmissions by wireless devices within each network to support detection by wireless devices operating in the other networks.

For example, each network may be allocated, configured, or otherwise assigned a set of SSB configurations (e.g., for the base stations operating within the networks) and/or SRS configurations (e.g., for the UEs operating within the networks). The SSB/SRS configurations may correspond to the reference signal measurement configuration. In some examples, the second networks (e.g., IIoT networks) may have a reserved set of SSBs and/or SRSs configured that are not utilized by the first network (e.g., the eMBB network). The SRS and/or SSB configurations may generally be unique among all potentially interfering networks. The role of the CxM may be to ensure that such SSB/SRS configurations are unique so that the networks can detect each other and avoid interference. To support this and avoid collision, an exclusion zone 215 may be prescribed or otherwise associated with each of the second networks. For example, exclusion zone 215-*a* may be configured for the second coverage area 210-*a*, exclusion zone 215-*b* may be configured for the second coverage area 210-*b*, and exclusion zone 215-*c* may be configured for the second coverage area 210-*c*. In some aspects, the OTA mechanism may be deployed within the exclusion zone 215, although such techniques may also be deployed within the corresponding second coverage areas 210.

Accordingly, a network discovery procedure may include each network being assigned a unique set of time and/or frequency resources to transmit reference signals (e.g., CSI-RS, SSB and/or SRS) so that all other networks can detect each other. This may support detecting which network (or a cell of the network) creates interference. In some aspects, this configuration may not necessarily support detecting interfering UEs (e.g., according to some conventional techniques). In some examples, all UEs served by a given base station within a network may use the same SRS configuration. That is, the CxM may configure the base stations within a network with a unique SSB configuration, which may then be adopted as the SRS configuration for the UEs associated with that base station. This may support each UE being able to detect the presence of base stations belonging to other networks through cell search techniques and/or SSB measurements.

In some wireless networks, techniques to avoid violating the target I/N value for the second networks (e.g., the higher priority networks) may include UEs within the first network detecting SRS/SSB transmissions from UEs/base stations in the second network, respectively. These UEs may then provide measurement reports to their serving base station, which transmits this information to the CxM. The CxM uses this information to update the resource configurations for each network to try and avoid violating the target I/N value for the second network. However, these techniques require numerous messages exchanged between the UE and its serving base station, the serving base station and the CxM, the CxM and the serving base station, and the serving base station back to the UE. This traditional approach using various messaging takes a considerable amount of time to implement, which may degrade or prevent the ability of the second network to support the higher priority traffic (e.g., eURLLC traffic).

Accordingly, aspects of the described techniques provide for, once the second network is detected, an open loop power control mechanism that can be used to dynamically adjust the maximum power or PSD (e.g., the transmission power limit) of wireless devices in the first network to prevent violation of the target I/N values of the second network. This power control mechanism may ensure that the lower priority network (e.g., the first network) does not create harmful interference to the high priority network (e.g., the second network), e.g., maintains an interference level for the second network being introduced by the first network to below a threshold interference level supported by the second network.

For example, the network devices of, or otherwise associated with, the first network may identify the second network(s) that are associated with a priority level higher than the first network. The network device may correspond to a serving base station in the first network and/or the serving base station in coordination with the CxM. The network device may identify the second network based on receiving information from the CxM identifying second network(s) having corresponding second coverage areas 210 that are within a defined geographical range of and/or at least partially overlap with the first coverage area 205 of the first network. The network device may, additionally or alternatively, identify the second network based on the network device (e.g., a serving base station) and/or one or more associated UEs in the first network detecting reference signals (e.g., SRS and/or SSB) being transmitted by wireless devices in the second network.

In some examples, the network device may identify the second network based on receiving an SRS and/or SSB configuration from the CxM identifying the SRS and/or SSB resource configurations for the first network and any second networks within the defined range of and/or having an overlapping second coverage area 210 of the first coverage area 205 of the first network. Accordingly, the network device (e.g., a serving base station) may transmit or otherwise provide an indication of a power control configuration and a reference signal measurement configuration to the UE operating within its associated first coverage area 205. For example, the power control configuration may identify an initial transmission power limit for the UE to use for wireless transmissions within the first network. In some aspects, the power control configuration may identify a threshold interference level supported by the second network (e.g., the target I/N value of the second network).

The reference signal measurement configuration may correspond to the resources used for reference signal transmissions by wireless devices in the first network and by wireless devices in the second network. For example, the reference signal measurement configuration may identify the scheduling and/or resources for the UEs in the first network to use for SRS transmissions. The reference signal measurement configuration may also identify the scheduling and the resources that the serving base station in the first network will use for SSB and/or CSI-RS transmissions. Similarly, the reference signal measurement configuration may correspond to the scheduling and/or resources used for reference signal transmission by wireless devices in the second network. As discussed, multiplexing techniques may be used for the reference signal transmission resources, e.g., TDM, such as when the first and second networks are synchronized, at least to some degree.

Accordingly, the UE operating within the first network may monitor for and receive a reference signal from at least one of the wireless devices of the second network according to the reference signal measurement configuration. For example, the UE may receive one or more SRS transmissions from UEs within the second network and/or one or more SSB and/or CSI-RS transmissions from base stations within the second network. The UE may use the power control configuration and/or the reference signal received from the wireless devices in the second network to determine an interference level for the second network introduced by the first network.

For example, the UE may determine an amount of interference to the second network that would be caused by transmissions from the UE according to the power control configuration, e.g., based on the initial transmission power limit (e.g., PSD) of the UE identified in the power control configuration received from its serving base station. The UE may then determine whether the amount of interference introduced into the second network caused by the wireless transmissions using the initial transmission power limit would maintain an interference level for the second network at or below a threshold interference level supported by the second network (e.g., would violate the target I/N value of the second network). If wireless transmissions from the UE using the initial transmission power limit would introduce sufficient interference into the second network to violate the threshold interference level supported by the second network, the UE may adjust its transmission power limit (e.g., PSD). For example, the UE may adjust (e.g., reduce) the initial transmission power limit of the UE to a value where the amount of interference introduced into the second network would be below the threshold interference level supported by the second network. Accordingly, the UE may then perform wireless transmission of signals to the serving base station according to the adjusted transmission power limit. Accordingly, this open loop power control mechanism provides techniques for a UE to autonomously adjust its transmission power limit (e.g., PSD) to avoid violating the target I/N value of the second network(s). Each second network may have a unique or the same target I/N values, e.g., based on the traffic type being communicated in the respective second network, and therefore the UE may adjust its transmission power limit separately for each second network in which it might introduce interference.

In some aspects, the serving base stations within the first network may also utilize these techniques to adjust its transmission power limit (e.g., PSD) based on detecting reference signals received from wireless devices operating in the second network. For example, the serving base station may receive a reference signal from at least one wireless device of the second network and determine whether the interference level for the second network introduced by the first network would be above or below a threshold interference level supported by the second network. If the interference level introduced into the second network would be above a threshold interference level supported by the second network, the serving base station may adjust (e.g., reduce) its transmission power limit to a level which maintains the interference level for the second network introduced by the first network to below the threshold interference level supported by the second network.

Accordingly, aspects of the described sharing mechanism may include a CxM being utilized to assign resources based on geographical locations where the networks are licensed to be deployed. The exclusion zones for an asynchronous deployment may be defined as a geographic location and applicable to the frequency resources assigned to the interfered network (e.g., the second network), as well as adjacent frequency resources. The exclusion zones for a synchronous deployment may be defined as a geographic location and potentially time resources applicable to frequencies assigned to the interfered network (e.g., the second network) as well as adjacent frequency resources. The transmission power limit (e.g., PSD) control mechanisms may protect the primary user's resources (e.g., the second network in a synchronous and/or asynchronous deployment and/or the first and second networks in a synchronous deployment). The secondary users (e.g., wireless devices in the first network) may reduce their transmission power limit (e.g., PSD) to ensure the target I/N values of the second network are met. This approach supports a "quick" interference management mechanism. In some examples, the wireless devices may report their measurement reports to the CxM (e.g., via the respective serving base stations in each network) and the CxM may reassign resources in an attempt to avoid possible target I/N value violations. However, the described clear channel assessment (CCA) based approach allows dynamic spectrum sharing and minimizes the need for unnecessary PSD control.

Figure 3A:
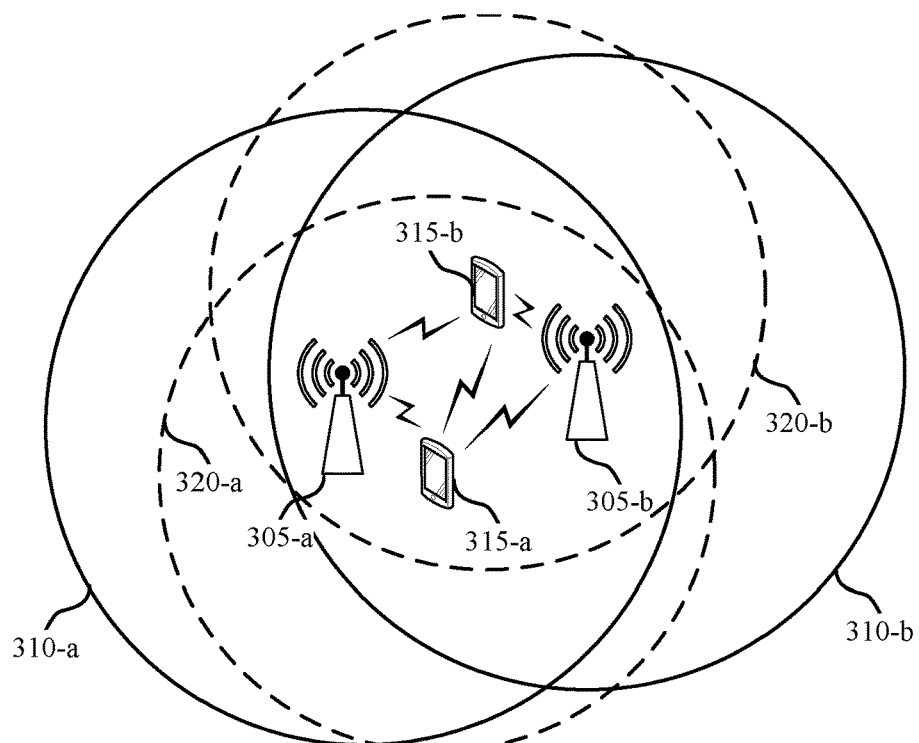
FIGS. 3A and 3B illustrates examples of wireless communication systems that supports eURLLC over-the-air mechanism for shared spectrum in accordance with aspects of the present disclosure.
Figure 3B:
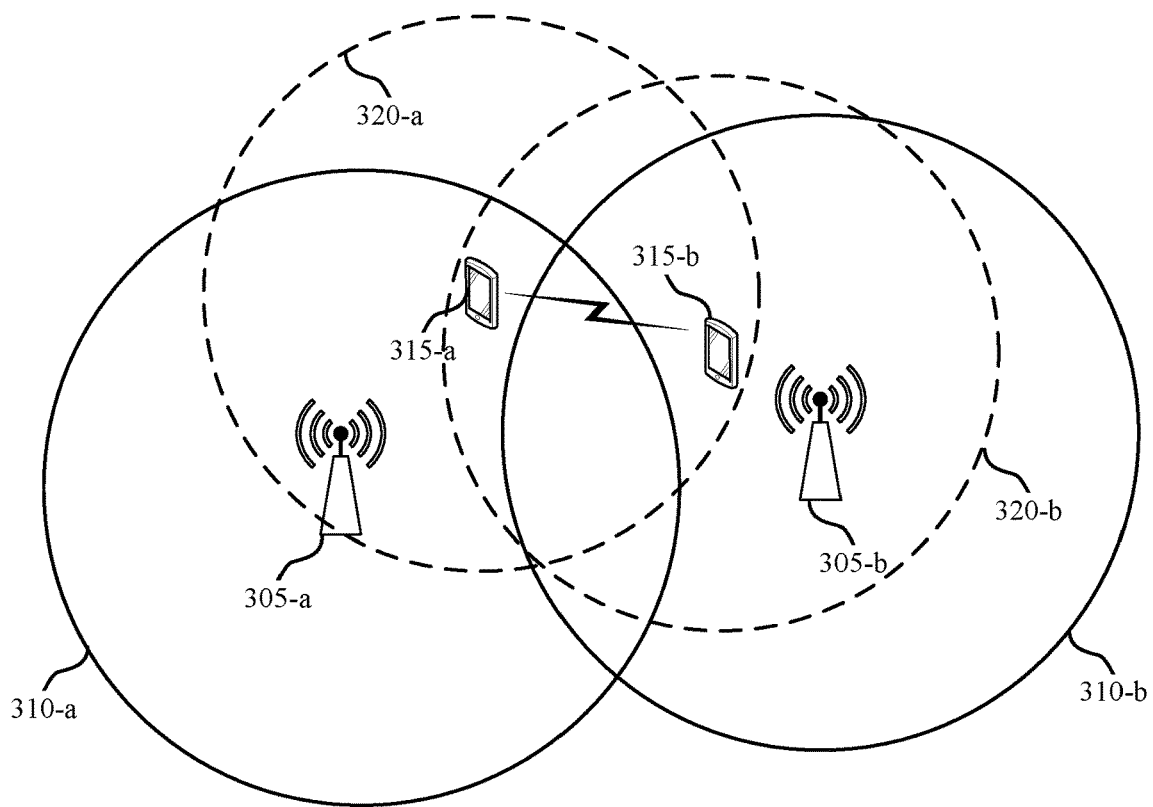

FIGS. 3A and 3B illustrate examples of a wireless communication system 300 that supports eURLLC over-the-air mechanism for shared spectrum in accordance with aspects of the present disclosure. In some examples, wireless communication system 300 may implement aspects of wireless communication systems 100 and/or 200. Aspects of wireless communication system 300 may be implemented by base stations 305 having corresponding coverage areas 310 and/or UEs 315 having corresponding coverage areas 320, which may be examples of the corresponding devices of the described herein. In some aspects, base station 305-*a* and UE 315-*a* may be associated with a first network and base station 305-*b* and UE 315-*b* may be associated with a second network. Broadly, wireless communication system 300-*a* of FIG. 3A illustrates an example where base station 305-*a* of the first network can detect wireless transmissions from base station 305-*b* of the second network. Wireless communication system 300-*b* of FIG. 3B illustrates an example where base station 305-*a* of the first network cannot detect wireless transmissions of base station 305-*b* of the second network.

As discussed above, aspects of the described techniques provide a mechanism where UEs and/or base station(s) within the first network (e.g., such as UE 315-*a* served by base station 305-*a* of the first network) can autonomously implement an open loop power control mechanism to avoid violating a target I/N value (e.g., a threshold interference level) supported by the second network. For example, base station 305-*a* may have a corresponding coverage area 310-*a* that is within a defined geographic range and/or at least partially overlaps with a coverage area 310-*b* of the base station 305-*b* of the second network. Moreover, the second network may be associated with higher priority level than the first network. For example, wireless transmissions between devices in the second network (e.g., base station 305-*b* and/or UE 315-*b* served by base station 305-*b* in the second network) may be associated with particular traffic type (e.g., eURLLC, IIoT, and the like) that has a more stringent performance requirement than the traffic type being communicated by devices in the first network.

A CxM may manage one or more aspects of coexistence between the first network and the second network in a shared spectrum scenario. Accordingly, the CxM may configure, allocate, or otherwise identify reference signal resources that are multiplexed between the networks in order to support detection of each network by the surrounding networks. The CxM may transmit or otherwise provide an indication of the reference signal resources (e.g., CSI-RS, SRS and/or SSB configurations, which may correspond to a reference signal measurement configuration) to each base station operating in the first and second networks. Accordingly, each base station may provide an initial power control configuration and reference signal measurement configuration to its served UEs. For example, base station 305-*a* may transmit an indication of the power control configuration and reference signal measurement configuration to UE 315-*a* in the first network and base station 305-*b* may transmit an indication of the power control configuration and reference signal measurement configuration to UE 315-*b* in the second network. As discussed above, the reference signal measurement configuration may identify the resources used for transmitting reference signals in a multiplexed fashion (e.g., TDM) between respective networks. For example, the reference signal measurement configuration for the first network may include base station 305-*a* transmitting CSI-RSs and/or SSBs and/or UE 315-*a* transmitting SRSs during a first time period or reference signal transmission window, with wireless devices in the second network configured to monitor for such reference signals during the first time period or reference signal transmission window. Similarly, the reference signal measurement configuration for the second network may include base station 305-*b* transmitting CSI-RSs and/or SSBs and/or UE 315-*b* transmitting SRSs during a second time period or reference signal transmission window, with wireless devices in the first network configured to monitor for such reference signals during the second time period or reference signal transmission window.

Moreover, the power control configuration may specify an initial transmission power level (e.g., PSD) for base station 305-*a* and/or UE 315-*a* to use for performing transmissions in the first network. However, the wireless devices in the first network (e.g., the lower priority network) may autonomously adjust their transmission power limits based on reference signals detected from the wireless devices in the second network in order to maintain an interference level for the second network introduced by transmissions in the first network to below a threshold interference level that can be supported by the second network.

For example, UE 315-*a* may receive or otherwise detect reference signal transmissions from at least one wireless device (e.g., SSB transmissions from base station 305-*b* and/or SRS transmissions from UE 315-*b*) in the second network. UE 315-*a* may determine the interference level for the second network introduced by the first network based on the power control configuration signaled from base station 305-*a* and the detected reference signals. For example, UE 315-*a* may determine a receive power level (e.g., received signal strength indicator (RSSI)) for the detected reference signals, which may be used to determine the pathloss between UE 315-*a* and the wireless device in the second network transmitting the reference signal. Based on the pathloss, UE 315-*a* may determine the amount of interference that would be introduced into the second network by performing wireless transmissions in the first network according to the initial transmission power limit of UE 315-*a* configured by the power control configuration. If UE 315-*a* determines that the interference introduced into the second network would be at or above a threshold interference level supported by the second network (e.g., the target I/N value of the second network), UE 315-*a* may adjust (e.g., decrease) the initial transmission power level to a level that would maintain the interference level for the second network introduced by the first network to below the threshold interference level supported by the second network. If UE 315-*a* determines that the amount of interference introduced into the second network by wireless transmissions using the initial transmission power limit are below the threshold interference level supported by the second network, UE 315-*a* may continue to use the initial transmission power limit configured in the power control configuration.

Similarly, base station 305-*a* may also detect reference signals transmitted by wireless devices (e.g., SRSs transmitted by UE 315-*b* and/or SSBs transmitted by base station 305-*b*) of the second network. Base station 305-*a* may also determine the interference level for the second network introduced by the first network and, if needed, adjust the transmission power limit (e.g., PSD) for base station 305-*a* (e.g., reduce the transmission power limit) in order to maintain the interference level for the second network introduced by the first network to below the threshold interference level (e.g., the target I/N value) supported by the second network.

Accordingly, wireless communication system 300-*a* of FIG. 3A illustrates an example where all nodes within the first and second networks can detect each other. The network that detects SRS transmissions or SSB transmissions, or both, from other networks may report the measurements to the CxM, with the measurement report identifying the interfering network. The CxM may update the resource configuration to mitigate this interference and/or implement a dynamic CCA based sharing of the spectrum for the networks.

Turning to wireless communication system 300-*b* of FIG. 3B, in this example the UEs 315 from the different network can detect each other, but the base stations 305 cannot detect each other or other UEs. Reference signal measurements (e.g., SRS measurements) may be reported to the serving network, which may also be reported to the CxM if the reporting threshold is met. Interference may be occurring among some UEs (e.g., UE 315-*a* in the first network and UE 315-*b* in the second network), but the CxM may or may not reassign resources. Instead, the wireless devices may rely on the described power control techniques (e.g., PSD control) and/or CCA based dynamic sharing. That is, UE 315-*a* may determine the interference it would introduce into the second network and, if needed, adjust its transmission power limit to maintain the interference level introduced into the second network to maintain the interference level to below the threshold interference level supported by the second network.

Figure 4:
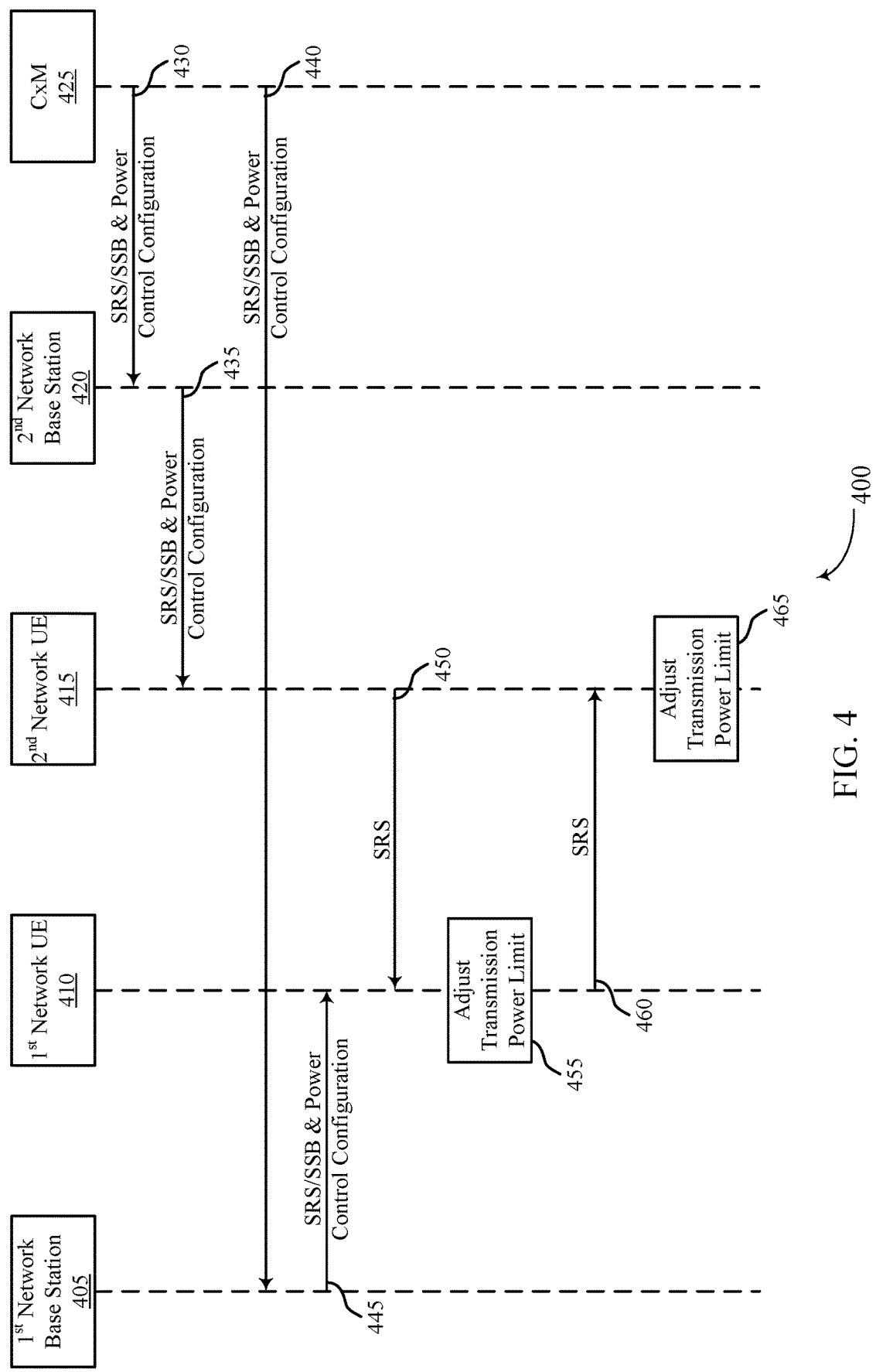
FIG. 4 illustrates an example of a process that supports eURLLC over-the-air mechanism for shared spectrum in accordance with aspects of the present disclosure.

FIG. 4 illustrates an example of a process 400 that supports eURLLC over-the-air mechanism for shared spectrum in accordance with aspects of the present disclosure. In some examples, process 400 may implement aspects of wireless communication systems 100, 200, and/or 300. Aspects of process 400 may be implemented by base station 405 of the first network, UE 410 of the first network, UE 415 of the second network, base station 420 of the second network, and/or CxM 425, which may be examples of the corresponding devices described herein. In some aspects, base station 405 of the first network may also be referred to as a network device when implementing (alone and/or in coordination with CxM 425) aspects of the described techniques.

Broadly, process 400 illustrates an example where wireless devices in the first network (e.g., UE 410) and wireless devices in the second network (e.g., UE 415) may perform an open loop power control mechanism to avoid causing interference to the other network beyond a threshold interference level supported by the network. The wireless devices in each network may perform such techniques based on one network having a higher priority than the other network (e.g., the second network having a higher priority than the first network, or vice versa), based on there being at least some degree of overlap between the coverage area of the two networks, based on a shared spectrum coexistence management scheme implemented for the two networks, and the like.

At 430, CxM 425 may transmit (and base station 420 of the second network may receive) a reference signal measurement configuration and power control configuration. The reference signal measurement configuration may generally identify resources and/or timing parameters for the wireless devices operating in the first network and/or wireless devices operating in the second network. For example, the reference signal measurement configuration (e.g., CSI-RS, SRS and/or SSB configuration) may identify the timing and/or resources for reference signal transmissions by wireless devices in the second network (e.g., UE 415 and/or base station 420) and/or identify timing and/or resources which wireless devices in the second network monitor for reference signal transmissions from wireless devices in the first network, or vice versa. Generally the power control configuration may identify an initial transmission power limit (e.g., PSD) that wireless devices operating in the second network are to implement when performing wireless transmissions, an initial transmission power limit (e.g., PSD) that wireless devices operating in the first network are to implement when performing wireless transmissions, identify a threshold interference level (e.g., a target I/N value) supported by the second network, and/or identify a threshold interference level (e.g., target I/N value) supported by the first network.

At 435, base station 420 may transmit (and UE 415 may receive from base station 420 serving UE 415 in the second network) an indication of the power control configuration and/or reference signal measurement configuration. For example, base station 420 may convey the information provided by CxM 425 at 430 to UE 415. Accordingly, UE 415 in the second network may know which resources and/or timing patterns are to be used for performing reference signal transmissions (e.g., SRS) in the second network. Similarly, UE 415 in the second network may know which resources and/or timing patterns are to be used by the wireless devices in the first network to perform reference signal transmissions (e.g., SRS and/or SSB).

At 440, CxM 425 may transmit (and base station 405 of the first network may receive) a reference signal measurement configuration and power control configuration. The reference signal measurement configuration may generally identify resources and/or timing parameters for the wireless devices operating in the first network and/or wireless devices operating in the second network. For example, the reference signal measurement configuration (e.g., CSI-RS, SRS and/or SSB configuration) may identify the timing and/or resources for reference signal transmissions by wireless devices in the first network (e.g., UE 410 and/or base station 405) and/or identify timing and/or resources which wireless devices in the second network monitor for reference signal transmissions from wireless devices in the first network. Generally the power control configuration may identify an initial transmission power limit (e.g., PSD) that wireless devices operating in the second network are to implement when performing wireless transmissions, an initial transmission power limit (e.g., PSD) that wireless devices operating in the first network are to implement when performing wireless transmissions, identify a threshold interference level (e.g., a target I/N value) supported by the second network, and/or identify a threshold interference level (e.g., target I/N value) supported by the first network.

At 445, base station 405 may transmit (and UE 410 may receive from base station 405 serving UE 410 in the first network) an indication of the power control configuration and/or reference signal measurement configuration. For example, base station 405 may convey the information provided by CxM 425 at 440 to UE 410. Accordingly, UE 410 in the first network may know which resources and/or timing patterns are to be used for performing reference signal transmissions (e.g., SRS) in the first network. Similarly, UE 410 in the first network may know which resources and/or timing patterns are to be used by the wireless devices in the second network to perform reference signal transmissions (e.g., SRS and/or SSB).

At 450, UE 415 may transmit (and UE 410 may receive) a reference signal (e.g., SRS) according to the power control configuration and/or reference signal measurement configuration provided by base station 420. For example, UE 415 may transmit an SRS using the resources and/or timing pattern identified in the reference signal measurement configuration and using an initial transmission power level as configured by the power control configuration.

At 455, UE 410 may determine an interference level for the second network introduced by the first level based on the power control configuration and the reference signal received from UE 415. For example, UE 410 may determine an amount of interference to the second network that would be introduced by transmissions from UE 410 according to the power control configuration (e.g., the initial transmission power limit of UE 410 as configured by base station 405 at 445). UE 410 may know the threshold interference level supported by the second network (e.g., based on the power control configuration). Accordingly, UE 410 may determine the amount of interference introduced into the second network by the first network (e.g., based on the path loss calculated using the received SRS), such as what the received power level would be at UE 415 if UE 410 performs transmissions using the initial transmission power limit configured by the power control configuration. Accordingly, UE 410 may determine whether wireless transmissions performed using the transmission power limit would cause or introduce interference into the second network that satisfy or exceed the threshold interference level supported by the second network (e.g., the target I/N value supported by the second network). If transmissions performed using the initial transmission power limit of UE 410 would cause interference in the second network at or above the threshold interference level supported by the second network, UE 410 may adjust (e.g., decrease) its transmission power limit (e.g., PSD). The adjusted (e.g., reduced) transmission power limit may enable UE 410 to perform transmissions in the first network while maintaining an interference level for the second network introduced by the first network to below the threshold interference level supported by the second network.

At 460, UE 410 may transmit (and UE 415 may receive) a reference signal (e.g., SRS) according to the power control configuration and/or reference signal measurement configuration provided by base station 405. For example, UE 410 may transmit an SRS using resources and/or timing pattern identified in the reference signal measurement configuration and using an initial transmission power level as configured by the power control configuration.

At 465, UE 415 may determine an interference level for the first network introduced by the second network based on the power control configuration and the reference signal received from UE 410. For example, UE 415 may determine an amount of interference to the first network that would be introduced by transmissions from UE 415 according to the power control configuration (e.g., the initial transmission power limit of UE 415 as configured by base station 420 at 435). UE 415 may know the threshold interference level supported by the first network (e.g., based on the power control configuration). Accordingly, UE 415 may determine the amount of interference introduced into the first network by the second network (e.g., based on the path loss calculated using the received SRS, and by determining what the received power level would be at UE 410 if UE 415 performs transmissions using the initial transmission power limit configured by the power control configuration). Accordingly, UE 415 may determine whether wireless transmissions performed using the transmission power limit would cause or introduce interference into the first network that satisfies or exceeds a threshold interference level supported by the first network (e.g., the target I/N value supported by the first network). If transmissions performed using the initial transmission power limit of UE 415 would cause interference in the first network at or above the threshold interference level supported by the first network, UE 415 may adjust (e.g., decrease) its transmission power limit (e.g., PSD). The adjusted (e.g., reduced) transmission power limit may enable UE 415 to perform transmissions in the second network while maintaining an interference level for the first network introduced by the second network to below the threshold interference level supported by the first network.

Accordingly, process 400 illustrates an example process that may be utilized to support shared spectrum coexistence between the wireless devices operating in the first and second networks. These techniques may be implemented when one network has a higher priority level than the other network, when the coverage areas of the respective networks (and/or wireless devices operating in the networks) overlap at least to some degree, based on the fact that the first and second networks share at least a portion of a radio frequency spectrum band, and the like.

Although the described techniques are shown as being implemented based on the SRS transmissions from the UEs in the first and second networks, it is to be understand that these techniques may be implemented based on CSI-RS and/or SSB transmissions received from the base stations in the other networks. For example, UE 410 may adjust its transmission power limit to maintain the interference level introduced into the second network by the first network to below the threshold interference level supported by the second network based on receiving SSB transmissions from base station 420. Similarly, UE 415 may adjust its transmission power limit to maintain the interference level introduced into the first network by the second network to below the threshold interference level supported by the first network based on receiving SSB transmissions from base station 405.

Moreover, the base stations operating in each network may also implement these techniques to adjust their respective transmission power limits based on receiving reference signals (e.g. CSI-RS, SRS and/or SSB) from wireless devices operating in the other network. For example, base station 405 may adjust its transmission power limit to maintain the interference level introduced into the second network by the first network to below the threshold interference level supported by the second network based on receiving SRS transmissions from UE 415 and/or SSB transmissions from base station 420. Similarly, base station 420 may adjust its transmission power limit to maintain the interference level introduced into the first network by the second network to below the threshold interference level supported by the first network based on receiving SRS transmissions from UE 410 and/or SSB transmissions from base station 405.

Figure 5:
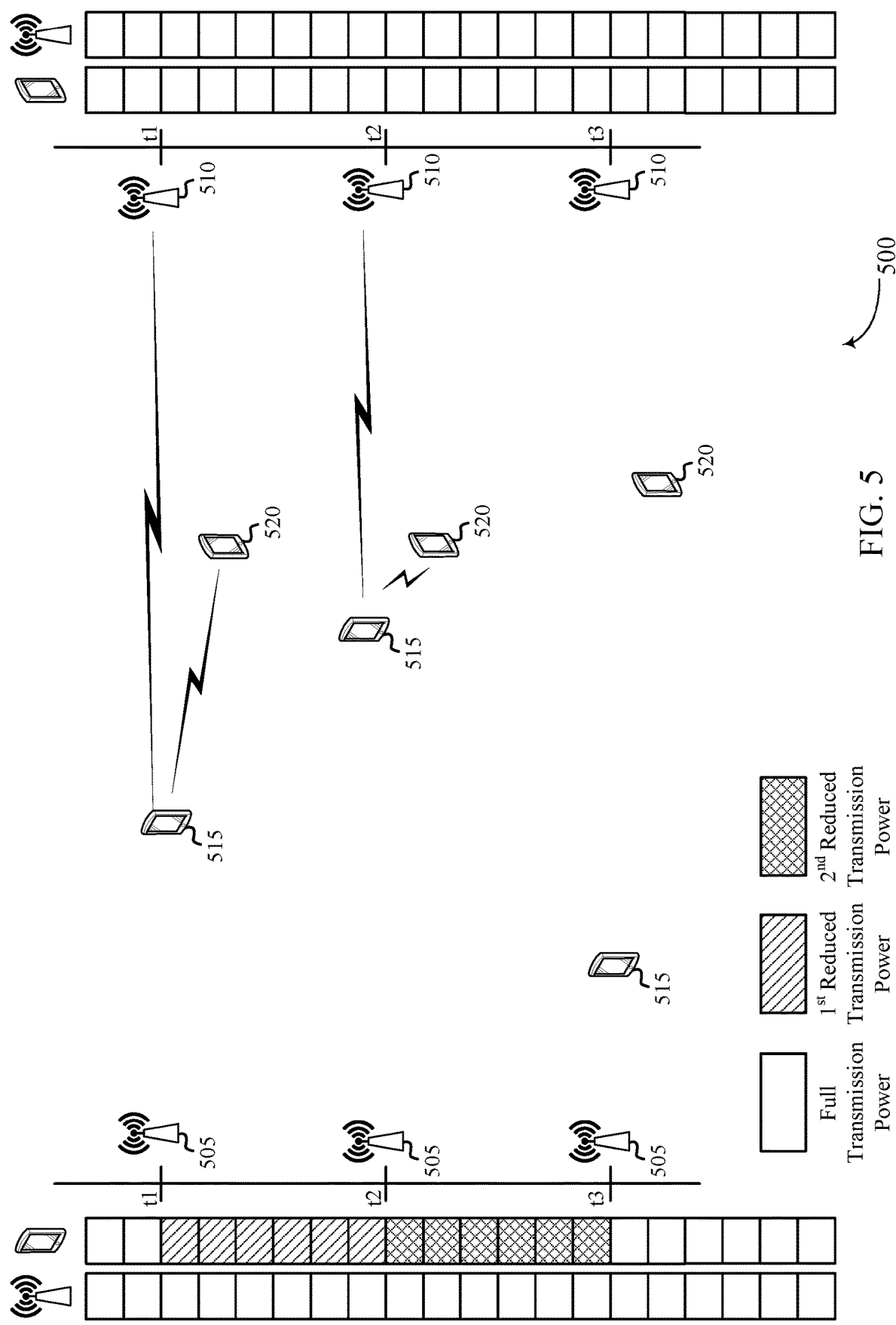
FIG. 5 illustrates an example of a wireless communication system that supports eURLLC over-the-air mechanism for shared spectrum in accordance with aspects of the present disclosure.

FIG. 5 illustrates an example of a wireless communication system 500 that supports eURLLC over-the-air mechanism for shared spectrum in accordance with aspects of the present disclosure. In some examples, wireless communication system 500 may implement aspects of wireless communication systems 100, 200, and/or 300, and/or process 400. Aspects of wireless communication system 500 may be implemented by base station 505, base station 510, UE 515, and UE 520, which may be examples of the corresponding devices described herein. In some aspects, base station 505 and UE 515 may be associated with a first network and base station 510 and UE 520 may be associated with a second network. The first and second networks may be associated with the same network operator or with different network operators.

Broadly, wireless communication system 500 illustrates adjustment of a transmission power limit (e.g., PSD limit) of UE 515 over time. Broadly, base station 505 may identify the second network that is associated with the priority level higher than the priority level of the first network. That is, wireless communications between base station 510 and UE 520 may have a higher priority level than wireless communications between base station 505 and UE 515. Wireless communication system 500 illustrates three instances occurring at t1, t2, and again at t3 where UE 515 monitors for and/or receives reference signal(s) transmitted by at least one wireless device of the second network, determines the interference level for the second network introduced by the first network, and then adjusts its transmission power level (e.g., PSD) to maintain the interference level for the second network introduced by the first network to below a threshold interference level supported by the second network.

Initially, base station 505 may transmit or otherwise convey an indication of a power control configuration and a reference signal measurement configuration to UE 515. The power control configuration may identify a transmission power limit for UE 515 (e.g., an initial transmission power limit for UE 515 to use to maintain an interference level for the second network introduced by the first network to below a threshold interference level supported by the second network). For example, the initial transmission power limit for UE 515 may be based on an initial estimation of the transmission power limit for UE 515 to use to maintain the interference level for the second network introduced by wireless transmissions from UE 515 in the first network to below the target I/N value supported by the second network. In some aspects, the power control configuration may also identify or otherwise provide an indication of the threshold interference level supported by the second network (e.g., the target I/N value supported by the second network). In some aspects, the reference signal measurement configuration may identify resources and/or the timing pattern for UE 515 to use for transmitting reference signals (e.g., SRSs) and/or the resources and/or timing patterns for wireless devices in the second network to use for transmitting reference signals (e.g., SRSs from UE 520 and/or CSI-RSs/SSBs from base station 510 of the second network). In the example illustrated in wireless communication system 500, it can be assumed that the first network operates utilizing a carrier frequency of (f) and the second network operates utilizing a carrier frequency of (fi) that is adjacent to the carrier frequency (f).

At t1, UE 515 is located close enough to one or more wireless devices of the second network (e.g., UE 520 and/or base station 510) to receive a reference signal from at least one of the wireless devices of the second network. The reference signal may be received according to the reference signal measurement configuration (e.g., using one or more of the identified resources and/or a timing pattern indicated in the reference signal measurement configuration). For example, UE 515 may receive a reference signal from UE 520 at a measured receive power level (e.g., RSSI(UE 520 1st Network (t1))) and a reference signal from base station 510 at a measured receive power level (e.g., RSSI(BS 510 1st Network (t1)). UE 515 may utilize the function UE 515_PSD_max(fi)=min(psd_max=f(RSSI(UE 520 (t1)), psd_max=f(RSSI(BS 510 (t1)) to calculate the interference level for the second network introduced by the first network.

UE 515 may determine the interference level for the second network introduced by the first network according to the power control configuration and the received reference signal. For example, UE 515 may determine an amount of interference that would be introduced into the second network by transmissions from UE 515 according to the power control configuration (e.g., using the initial transmission power limit of UE 515). If UE 515 determines that transmissions using its initial transmission power limit maintains an interference level for the second network introduced by the first network to below a threshold interference level supported by the second network, UE 515 would continue to use the initial transmission power limit indicated in the power control configuration. However, at t1 UE 515 determines that its initial transmission power limit introduces interference at or above a threshold interference level supported by the second network. Accordingly, at t1 UE 515 adjusts its initial transmission power limit to a first reduced transmission power limit to use for wireless transmissions in the first network. The first reduced transmission power limit may have a transmission power (e.g., PSD) lower than the initial transmission power limit in order to reduce interference for the second network introduced by the first network.

At t2, UE 515 may have moved (e.g., due to UE 515 mobility) to a position where it is closer to one or more wireless devices in the second network. Accordingly, UE 515 is located even closer to wireless devices of the second network (e.g., UE 520 and/or base station 510) to receive a reference signal from at least one of the wireless devices of the second network. The reference signal may be received according to the reference signal measurement configuration (e.g., using one or more of the identified resources and/or timing pattern indicated in the reference signal measurement configuration). For example, UE 515 may receive a reference signal from UE 520 at a measured receive power level (e.g., RSSI(UE 520 1st Network (t2)) and a reference signal from base station 510 at a measured receive power level (RSSI(BS 510 1st Network (t2)). UE 515 may utilize the function UE515_PSD_max(fi)=min(psd_max=f(RSSI(UE 520 (t2)), psd_max=f(RSSI(BS 510 (t2)) to calculate the interference level for the second network introduced by the first network.

UE 515 may determine the interference level for the second network introduced by the first network according to the first reduced transmission power limit (as adopted at t1) and the received reference signal. For example, UE 515 may determine an amount of interference that would be introduced into the second network by transmissions from UE 515 according to the power control configuration (e.g., using the first reduced transmission power limit of UE 515). If UE 515 determines that transmissions using its first reduced transmission power limit maintains an interference level for the second network introduced by the first network to below a threshold interference level supported by the second network, UE 515 would continue to use the first reduced transmission power limit adopted at t1. However, at t2 the UE determines that its first reduced transmission power limit introduces interference at or above a threshold interference level supported by the second network. Accordingly, at t2 UE 515 adjusts its first reduced transmission power limit to a second reduced transmission power limit to use for wireless transmissions in the first network. The second reduced transmission power limit may have a transmission power (e.g., PSD) lower than the first reduced transmission power limit in order to further reduce interference for the second network introduced by the first network.

At t3, UE 515 may have moved (e.g., due to UE 515 mobility) to a position where it is no longer close enough to one or more wireless devices in the second network to receive a reference signal from at least one wireless device and the second network. Accordingly, UE 515 may determine the interference level for the second network introduced by the first network according to the second reduced transmission power limit (as adopted at t2) and the absence of a received reference signal. However, at t3 the UE 515 may, based on UE 515 not receiving a reference signal from a wireless device in the second network, adjust or otherwise adopt its initial transmission power limit to use for wireless transmissions in the first network. That is, UE 515 may utilize the function UE515_psd_max(fi)=no limit, e.g., due to wireless devices in the second network not being detected.

Accordingly, wireless communication system 500 illustrates an example where wireless devices in the first network (UE 515 in this example) relaxes, for an adjacent carrier frequency or the same carrier frequency, its PSD limit for the first network to ensure no interference from the first network due to adjacent channel leakage.

Figure 6:
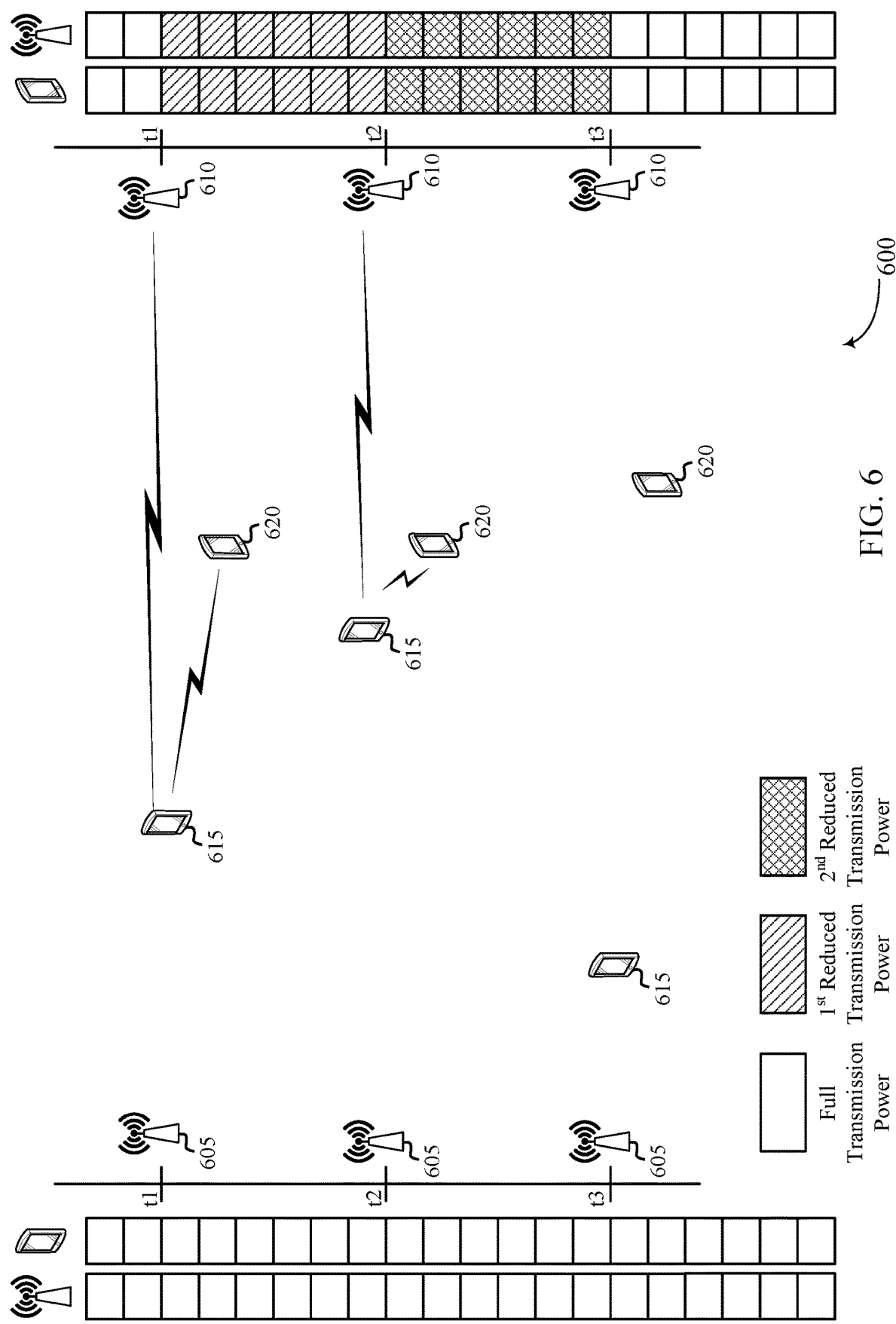
FIG. 6 illustrates an example of a wireless communication system that supports eURLLC over-the-air mechanism for shared spectrum in accordance with aspects of the present disclosure.

FIG. 6 illustrates an example of a wireless communication system 600 that supports eURLLC over-the-air mechanism for shared spectrum in accordance with aspects of the present disclosure. In some examples, wireless communication system 600 may implement aspects of wireless communication systems 100, 200, 300, and/or 500, and/or process 400. Aspects of wireless communication system 600 may be implemented by base station 605, base station 610, UE 615, and UE 620, which may be examples of the corresponding devices described herein. In some aspects, base station 605 and UE 615 may be associated with a second network and base station 610 and UE 620 may be associated with a first network. The first and second networks may be associated with the same network operator or with different network operators.

Broadly, wireless communication system 600 illustrates adjustment of a transmission power limit (e.g., PSD limit) of UE 620 and base station 610 over time. Broadly, base station 610 may identify the second network that is associated with the priority level higher than the priority level of the first network. That is, wireless communications between base station 605 and UE 615 may have a higher priority level than wireless communications between base station 610 and UE 620. Wireless communication system 600 illustrates three instances occurring at t1, t2, and again at t3 where base station 610 and UE 620 receives reference signal(s) transmitted by at least one wireless device of the second network, determines the interference level for the second network introduced by the first network, and then adjusts their respective transmission power levels (e.g., PSD) to maintain the interference level for the second network introduced by the first network to below a threshold interference level supported by the second network.

Initially, base station 610 may transmit or otherwise convey an indication of a power control configuration and a reference signal measurement configuration to UE 620. The power control configuration may identify a transmission power limit for UE 620 (e.g., an initial transmission power limit for UE 620 to use to maintain an interference level for the second network introduced by the first network to below a threshold interference level supported by the second network). For example, the initial transmission power limit for UE 620 may be based on an initial estimation of the transmission power limit for UE 620 to use to maintain the interference level for the second network introduced by wireless transmissions from UE 620 in the first network. In some aspects, the power control configuration may also identify or otherwise provide an indication of the threshold interference level supported by the second network (e.g., the target I/N value supported by the second network). Base station 610 may also have a corresponding initial transmission power level according to a power control configuration received from a CxM, for example. However, it is to be understood that references to transmission power limits (both initial and/or reduced) for UE 620 and base station 610 may not refer to the same transmission power limit. For example, the initial transmission power limit (e.g., PSD limit) for base station 610 may be different than the initial transmission power limit for UE 620. Furthermore, any reduced transmission power limit adopted by base station 610 may not necessarily correspond to the same transmission power limit as a reduced transmission power limit adopted by UE 620.

In some aspects, the reference signal measurement configuration may identify resources and/or the timing pattern for UE 620 to use for transmitting reference signals (e.g., SRSs) and/or the resources and/or timing patterns for wireless devices in the second network to use for transmitting reference signals (e.g., SRSs from UE 615 and/or CSI-RSs/SSBs from base station 605 of the second network). In the example illustrated in wireless communication system 600, it can be assumed that the first network operates utilizing a carrier frequency of (f) and the second network operates utilizing an adjacent carrier frequency of (fi).

At t1, UE 615 of the second network is located close enough to one or more wireless devices of the first network (e.g., UE 620 and base station 610) that these devices may receive a reference signal from UE 615. The reference signal may be received according to the reference signal measurement configuration (e.g., using one or more of the identified resources and/or timing pattern indicated in the reference signal measurement configuration). For example, UE 620 may receive a reference signal from UE 615 at a measured receive power level (e.g., RSSI(UE 615 1st Network (t1)) and base station 610 may receive a reference signal from UE 615 at a measured receive power level (RSSI(UE 615 1st Network (t1)). UE 620 may utilize the function UE620_psd_max(fi)=psd_max=f(RSSI(UE 615 (t1)) and base station 610 may utilize the function BS610_psd_max (fl)=psd_max=f(RSSI(UE 615 (t1)) to calculate the interference levels for the second network introduced by the first network.

Accordingly, both UE 620 and base station 610 may determine the interference level for the second network introduced by the first network according to the power control configuration and the received reference signals. For example, UE 620 and base station 610 may both determine an amount of interference that would be introduced into the second network by transmissions from UE 620 and base station 610 according to their respective power control configurations (e.g., using the initial transmission power limit of UE 620 and base station 610). At t1, both UE 620 and base station 610 determine that their initial transmission power limit introduces interference at or above a threshold interference level supported by the second network. Accordingly, at t1 both UE 620 and base station 610 adjusts their initial transmission power limit to a first reduced transmission power limit to use for wireless transmissions in the first network. The first reduced transmission power limit may have a transmission power (e.g., PSD) lower than the initial transmission power limit in order to reduce interference for the second network introduced by the first network. Again, it is to be understood that the first reduced transmission power limit adopted by UE 620 may not necessarily be the same transmission power limit as the first reduced transmission power limit adopted by base station 610.

At t2, UE 615 of the second network is located even closer to one or more wireless devices of the first network (e.g., UE 620 and base station 610) such that these devices may receive a reference signal from UE 615. For example, UE 620 may receive a reference signal from UE 615 at a measured receive power level (e.g., RSSI(UE 615 2nd Network (t2)) and base station 610 may receive a reference signal from UE 615 at a measured receive power level (RSSI(UE 615 2nd Network (t2)). UE 620 may utilize the function UE620_psd_max(fi)=psd_max=f(RSSI(UE 615 (t2)) and base station 610 may utilize the function BS610_psd_max(fl)=psd_max=f(RSSI(UE 615 (t2)) to calculate the interference levels for the second network introduced by the first network.

Accordingly, both UE 620 and base station 610 may determine the interference level for the second network introduced by the first network according to the power control configuration and the received reference signals. For example, UE 620 and base station 610 may both determine an amount of interference that would be introduced into the second network by transmissions from UE 620 and base station 610 according to their respective power control configurations (e.g., using the first reduced transmission power limits of UE 620 and base station 610 adopted at t1). At t2, both UE 620 and base station 610 determine that their first reduced transmission power limit introduces interference at or above a threshold interference level supported by the second network. Accordingly, at t2 both UE 620 and base station 610 adjusts their first reduced transmission power limit to a second reduced transmission power limit to use for wireless transmissions in the first network. The second reduced transmission power limit may have a transmission power (e.g., PSD) lower than the first reduced transmission power limit in order to reduce interference for the second network introduced by the first network. Again, it is to be understood that the second reduced transmission power limit adopted by UE 620 may not necessarily be the same transmission power limit as the second reduced transmission power limit adopted by base station 610.

At t3, UE 615 of the second network may have moved (e.g., due to UE 615 mobility) to a position where it is no longer close enough to one or more wireless devices in the first network to receive a reference signal from at least one wireless device in the second network. Accordingly, UE 620 and base station 610 may determine the interference level for the second network introduced by the first network according to the second reduced transmission power limit (as adopted at t2) and the absence of a received reference signal. However, at t3 UE 620 and base station 610 may, based on not receiving a reference signal from a wireless device in the second network, adjust or otherwise adopt their respective initial transmission power limits to use for wireless transmissions in the first network. That is, UE 620 may utilize the function UE620_psd_max(fi)=no limit and base station 610 may utilize the function BS610_psd_max(fi)=no limit, e.g., due to wireless devices in the second network not being detected.

Accordingly, wireless communication system 600 illustrates an example where wireless devices in the first network (UE 620 and base station 610 in this example) relaxes, for an adjacent carrier frequency or the same carrier frequency, its PSD limit for the first network to ensure no interference from the first network due to adjacent channel leakage.

Figure 7:
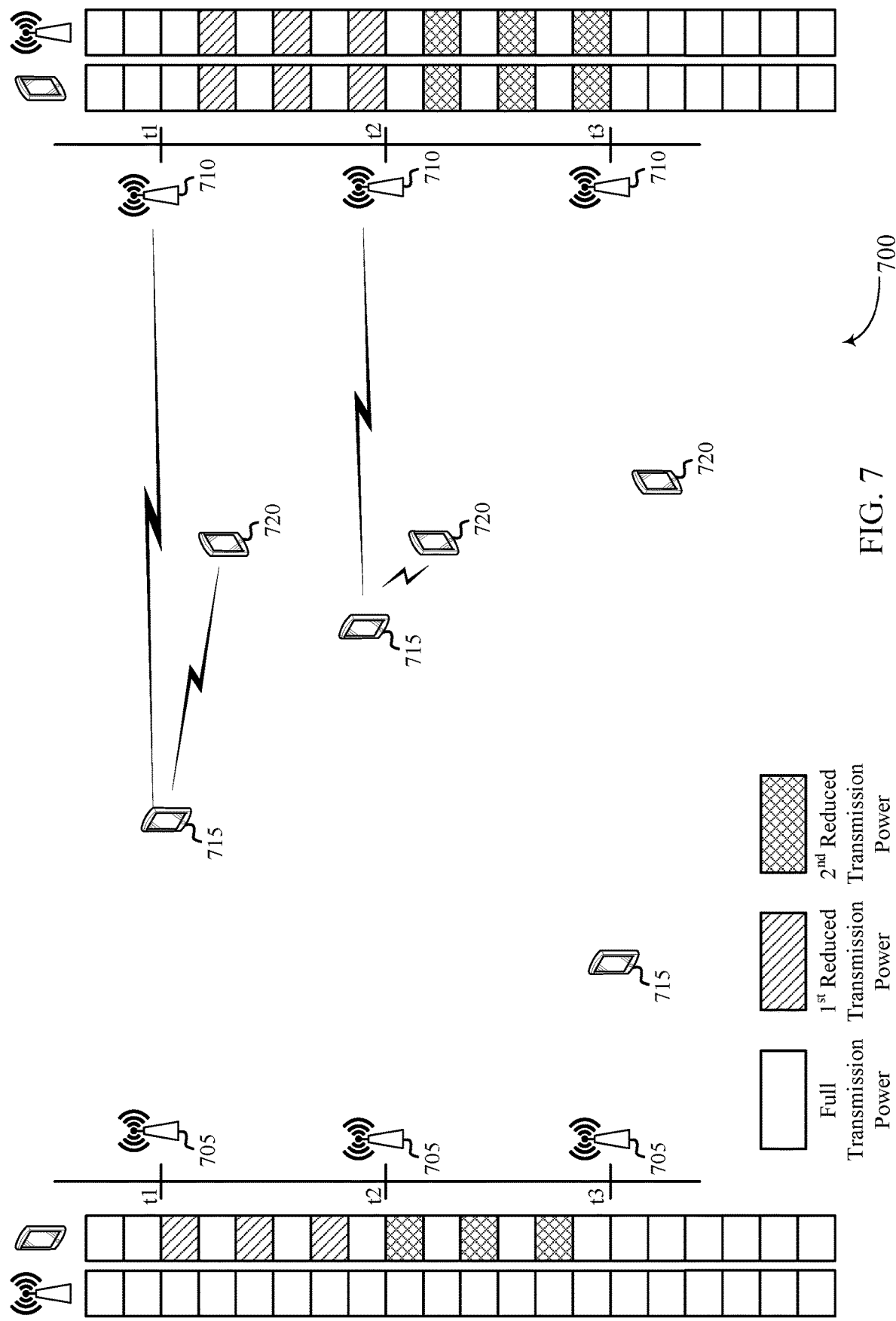
FIG. 7 illustrates an example of a wireless communication system that supports eURLLC over-the-air mechanism for shared spectrum in accordance with aspects of the present disclosure.

FIG. 7 illustrates an example of a wireless communication system 700 that supports eURLLC over-the-air mechanism for shared spectrum in accordance with aspects of the present disclosure. In some examples, wireless communication system 700 may implement aspects of wireless communication systems 100, 200, 300, 500, and/or 600, and/or process 400. Aspects of wireless communication system 700 may be implemented by base station 705, base station 710, UE 715, and UE 720, which may be examples of the corresponding devices described herein. In some aspects, base station 705 and UE 715 may be associated with a first network and base station 710 and UE 720 may be associated with a second network. However, in the example illustrated in wireless communication system 700, each of the first and second networks may have their own prioritized set of resources. The first and second networks may be associated with the same network operator or with different network operators. In the example illustrated in wireless communication system 700, there is at least some degree of synchronization (e.g., in the time domain) between the first network and the second network.

Broadly, in some examples the first and second network may be synchronous (e.g., share at least some degree of timing synchronization) or asynchronous (e.g., may not be aware of each other's network timing). In the situation where the second network (e.g., a higher priority network) is employed as an asynchronous network, an exclusion zone around the second network may be increased to improve the efficiency of the discovery procedure. For example, wireless devices in the first network need to detect base stations in the second network before discovering UEs operating in the second network. Additionally, UEs and/or base stations in the second network may be configured with measurement gaps to detect wireless devices in the first network creating potentially unacceptable service interruption. While this may be addressed in some deployments, it may increase licensing costs for the network operators (e.g., at least for the second network operator).

In the situation where the first network is deployed as an asynchronous network, the first network may also rely on measurement gaps to detect wireless devices in the second network. Moreover, the ability to detect SRS transmissions from UEs in the second network before detecting SSB transmissions from base stations in the second network may create an issue with regards to UE discovery.

However, as discussed above wireless communication system 700 illustrates an example where there is at least some degree of synchronization between the first network and the second network. This may optimize the measurement procedures to improve discovery of the other network. This enables alignment of a TDD configuration among the networks utilizing the same and/or adjacent frequency resources. In some examples, this may also facilitate relaxation of the base station effective isotropic radiated power (EIRP) limit. As further discussed below, this may enable time domain resource partitioning between the two networks and an efficient sensing based medium sharing mechanism.

Accordingly, each network may be configured with its own prioritized set of resources where the PSD limitation (e.g., adjusted transmission power limit) may apply only for resources prioritized for the other network and applicable only for wireless devices that, based on measurements of reference signals, are possible interferes with the other network. In some examples, each network can utilize the other network's resources if its senses the medium and does not detect the other network using those resources (e.g., does not detect a reference signal, a reservation signal, and the like, transmitted from wireless devices in the other network).

Broadly, wireless communication system 700 illustrates adjustment of a transmission power limit (e.g., PSD limit) of wireless devices in both the first network and the second network over time. Broadly, base stations 705 and 710 may identify the other networks, e.g., based on information received from a CxM. Wireless communication system 700 illustrates three instances occurring at t1, t2, and again at t3 where wireless devices in both the first network and the second network monitors and/or receives reference signal(s) transmitted by at least one wireless device of the other network, determines the interference level for the other network introduced by the their respective network, and then adjusts their respective transmission power levels (e.g., PSD) to maintain the interference level for the other network introduced by the respective network to below a threshold interference level supported by the other network. However, adjustments to the respective transmission power levels may be performed in a synchronized manner to avoid interfering with the other network's prioritized resources.

Initially, base stations 705 and 710 may transmit or otherwise convey an indication of a power control configuration and a reference signal measurement configuration to UE 715 and 720, respectively. The power control configuration may identify a transmission power limit for UEs (e.g., an initial transmission power limit for the UEs to use to maintain an interference level for the other network introduced by their respective network to below a threshold interference level supported by the other network). In some aspects, the power control configuration may also identify or otherwise provide an indication of the threshold interference level supported by the other network (e.g., the target I/N value supported by the other network). Base stations 705 and 710 may also have corresponding initial transmission power levels according to a power control configuration received from a CxM, for example. However, it is to be understood that references to transmission power limits (both initial and/or reduced) for UEs and base stations of either network may not refer to the same transmission power limit. For example, the initial transmission power limit (e.g., PSD limit) for base station 705 may be different than the initial transmission power limit for UE 715.

In some aspects, the reference signal measurement configuration may identify resources and/or the a timing pattern for the wireless devices to use for transmitting reference signals (e.g., CSI-RSs, SSBs and/or SRSs) and/or the resources and/or timing patterns for wireless devices in the other network to use for transmitting reference signals (e.g., CSI-RSs, SSBs and/or SRSs). In the example illustrated in wireless communication system 700, it can be assumed that the first network operates utilizing a carrier frequency of (f) and the second network operates utilizing an adjacent carrier frequency of (fi).

At t1, UE 715 is located close enough to one or more wireless devices of the second network (e.g., UE 720 and/or base station 710) to receive a reference signal from at least one of the wireless devices of the second network. The reference signal may be received according to the reference signal measurement configuration (e.g., using one or more of the identified resources and/or timing pattern indicated in the reference signal measurement configuration). For example, UE 715 may receive a reference signal from UE 720 at a measured receive power level (e.g., RSSI(UE 720 2nd Network (t1)) and a reference signal from base station 710 at a measured receive power level (RSSI(BS 710 2nd Network (t1)). UE 715 may utilize the function UE715_PSD_max(fi)=min(psd_max=f(RSSI(UE 720(t1)), psd_max=f(RSSI(BS 710(t1)) to calculate the interference level for the second network introduced by the first network.

UE 715 may determine the interference level for the second network introduced by the first network according to the power control configuration and the received reference signals. For example, UE 715 may determine an amount of interference that would be introduced into the second network by transmissions from UE 715 according to the power control configuration (e.g., using the initial transmission power limit of UE 715). At t1 UE 715 determines that its initial transmission power limit introduces interference at or above a threshold interference level supported by the second network. Accordingly, at t1 UE 715 adjusts its initial transmission power limit to a first reduced transmission power limit to use for wireless transmissions in the first network. The first reduced transmission power limit may have a transmission power (e.g., PSD) lower than the initial transmission power limit in order to reduce interference for the second network introduced by the first network.

However, UE 715 may adjust its transmission power limit to the first reduced transmission power limit according to a synchronized pattern. For example, the time period between t1 and t2 may be partitioned into multiple reference signal transmission windows. Broadly, the reference signal transmission windows may correspond to a timing pattern in which each of the first network and the second network has prioritized resources. For example, resources configured for the first network during a first reference signal transmission window may be lower priority than the resources configured for the second network. Accordingly, UE 715 adjusting its transmission power limit may include adopting the first reduced transmission power limit during every other (e.g., the first, the third, and the fifth) reference signal transmission window. However, resources configured for the first network during the alternate reference signal transmission windows (e.g., the second, the fourth, and the sixth) may have a higher priority than the resources configured for the second network. Accordingly and during these reference signal transmission windows, UE 715 may adopt its initial transmission power limit to support communications using the higher priority resources.

Similarly and also at t1, UE 720 and base station 710 of the second network are located close enough to UE 715 of the first network that these devices may receive a reference signal from UE 715. The reference signal may be received according to the reference signal measurement configuration (e.g., using one or more of the identified resources and/or timing pattern indicated in the reference signal measurement configuration). For example, UE 720 may receive a reference signal from UE 715 at a measured receive power level (e.g., RSSI(UE 715 1st Network (t1)) and base station 710 may receive a reference signal from UE 715 at a measured receive power level (RSSI(UE 715 1st Network (t1)). UE 720 may utilize the function UE720_psd_max(fi)=psd_max=f(RSSI(UE 715(t1)) and base station 710 may utilize the function BS710_psd_max(fl)=psd_max=f(RSSI(UE 715 (t1)) to calculate the interference levels for the second network introduced by the first network.

Accordingly, both UE 720 and base station 710 may determine the interference level for the first network introduced by the second network according to the power control configuration and the received reference signals. For example, UE 720 and base station 710 may both determine an amount of interference that would be introduced into the first network by transmissions from UE 720 and base station 710 according to their respective power control configurations (e.g., using the initial transmission power limit of UE 720 and base station 710). At t1, both UE 720 and base station 710 determine that their initial transmission power limit introduces interference at or above a threshold interference level supported by the first network. Accordingly, at t1 both UE 720 and base station 710 adjusts their initial transmission power limit to a first reduced transmission power limit to use for wireless transmissions in the second network. The first reduced transmission power limit may have a transmission power (e.g., PSD) lower than the initial transmission power limit in order to reduce interference for the first network introduced by the second network. Again, it is to be understood that the first reduced transmission power limit adopted by UE 720 may not necessarily be the same transmission power limit as the first reduced transmission power limit adopted by base station 710.

Again, UE 720 and base station 710 may adjust their respective transmission power limits to the first reduced transmission power limit according to a synchronized pattern. For example, resources configured for the first network during a first reference signal transmission window may be lower priority than the resources configured for the second network. Accordingly, UE 720 and base station 710 adjusting the respective transmission power limit may include adopting the first reduced transmission power limit during every other (e.g., the second, the fourth, and the sixth) reference signal transmission window. Resources configured for the second network during the alternate reference signal transmission windows (e.g., the first, the third, and the fifth) may have a higher priority than the resources configured for the first network. Accordingly and during these reference signal transmission windows, UE 720 and base station 710 may adopt their respective initial transmission power limits to support communications using the higher priority resources.

At t2, UE 715 is located even closer to one or more wireless devices of the second network (e.g., UE 720 and/or base station 710) to receive a reference signal from at least one of the wireless devices of the second network, and vice versa. The reference signal may be received according to the reference signal measurement configuration (e.g., using one or more of the identified resources and/or timing pattern indicated in the reference signal measurement configuration). For example, UE 715 may receive a reference signal from UE 720 at a measured receive power level (e.g., RSSI(UE 720 2nd Network (t2)) and a reference signal from base station 710 at a measured receive power level (RSSI (BS 710 2nd Network (t2)). UE 715 may utilize the function UE715_PSD_max(fi)=min(psd_max=f(RSSI(UE 720(t2)), psd_max=f(RSSI(BS 710(t2)) to calculate the interference level for the second network introduced by the first network.

UE 715 may determine the interference level for the second network introduced by the first network according to the power control configuration and the received reference signals. For example, UE 715 may determine an amount of interference that would be introduced into the second network by transmissions from UE 715 according to the power control configuration (e.g., using the initial and/or first reduced transmission power limit of UE 715). At t2 UE 715 determines that its first reduced transmission power limit introduces interference at or above a threshold interference level supported by the second network. Accordingly, at t2 UE 715 adjusts its first reduced transmission power limit to a second reduced transmission power limit to use for wireless transmissions in the first network. The second reduced transmission power limit may have a transmission power (e.g., PSD) lower than the initial and first reduced transmission power limits in order to reduce interference for the second network introduced by the first network.

However, UE 715 may adjust its transmission power limit to the second reduced transmission power limit according to a synchronized pattern. For example, the time period between t2 and t3 may be partitioned into multiple reference signal transmission windows. Resources configured for the first network during a first reference signal transmission window may be lower priority than the resources configured for the second network. Accordingly, UE 715 adjusting its transmission power limit may include adopting the second reduced transmission power limit during every other (e.g., the first, the third, and the fifth) reference signal transmission window. However, resources configured for the first network during the alternate reference signal transmission windows (e.g., the second, the fourth, and the sixth) may have a higher priority than the resources configured for the second network. Accordingly and during these reference signal transmission windows, UE 715 may adopt its initial transmission power limit to support communications using the higher priority resources.

Similarly and also at t2, UE 720 and base station 710 of the second network are located even closer to UE 715 of the first network such that these devices may receive a reference signal from UE 715. The reference signal may be received according to the reference signal measurement configuration (e.g., using one or more of the identified resources and/or timing pattern indicated in the reference signal measurement configuration). For example, UE 720 may receive a reference signal from UE 715 at a measured receive power level (e.g., RSSI(UE 715 1st Network (t2)) and base station 710 may receive a reference signal from UE 715 at a measured receive power level (RSSI(UE 715 1st Network (t2)). UE 720 may utilize the function UE720_psd_max(fi)=psd_max=f(RSSI(UE 715(t2)) and base station 710 may utilize the function BS710_psd_max(fl)=psd_max=f(RSSI(UE 715 (t2)) to calculate the interference levels for the second network introduced by the first network.

Accordingly, both UE 720 and base station 710 may determine the interference level for the first network introduced by the second network according to the power control configuration and the received reference signals. For example, UE 720 and base station 710 may both determine an amount of interference that would be introduced into the first network by transmissions from UE 720 and base station 710 according to their respective power control configurations (e.g., using the initial and/or first reduced transmission power limit of UE 720 and base station 710). At t2, both UE 720 and base station 710 determine that their first reduced transmission power limit introduces interference at or above a threshold interference level supported by the first network. Accordingly, at t2 both UE 720 and base station 710 adjusts their first reduced transmission power limit to a second reduced transmission power limit to use for wireless transmissions in the second network. The second reduced transmission power limit may have a transmission power (e.g., PSD) lower than the initial and first reduced transmission power limits in order to reduce interference for the first network introduced by the second network. Again, it is to be understood that the second reduced transmission power limit adopted by UE 720 may not necessarily be the same transmission power limit as the second reduced transmission power limit adopted by base station 710.

Again, UE 720 and base station 710 may adjust their respective transmission power limits to the second reduced transmission power limit according to a synchronized pattern. For example, resources configured for the first network during a first reference signal transmission window may be higher priority than the resources configured for the second network. Accordingly, UE 720 and base station 710 adjusting the respective transmission power limits may include adopting the second reduced transmission power limit during every other (e.g., the second, the fourth, and the sixth) reference signal transmission window. Resources configured for the second network during the alternate reference signal transmission windows (e.g., the first, the third, and the fifth) may have a higher priority than the resources configured for the first network. Accordingly and during these reference signal transmission windows, UE 720 and base station 710 may adopt their respective initial transmission power limits to support communications using the higher priority resources.

At t3, UE 715 of the first network may have moved (e.g., due to UE 715 mobility) to a position where it is no longer close enough to one or more wireless devices in the second network to receive a reference signal from at least one wireless device in the second network, and vice versa. Accordingly, UE 715, UE 720 and base station 710 may determine the interference level for the other network introduced by the respective network according to the second reduced transmission power limit (as adopted at t2) and the absence of a received reference signal. However, at t3 these devices may, based on not receiving a reference signal from a wireless device in the other network, adjust or otherwise adopt their respective initial transmission power limits to use for wireless transmissions in the first and second networks, respectively. That is, UE 715 may utilize the function UE715_psd_max(fi)=no limit, UE 720 may utilize the function UE720_psd_max(fi)=no limit, and base station 710 may utilize the function BS710_psd_max(fi)=no limit, e.g., due to wireless devices in the other network not being detected.

Accordingly, wireless communication system 700 illustrates an example where wireless devices in each network relaxes, for an adjacent carrier frequency or the same carrier frequency, its PSD limit for the other network to ensure no interference from their respective network due to adjacent channel leakage.

Figure 8:
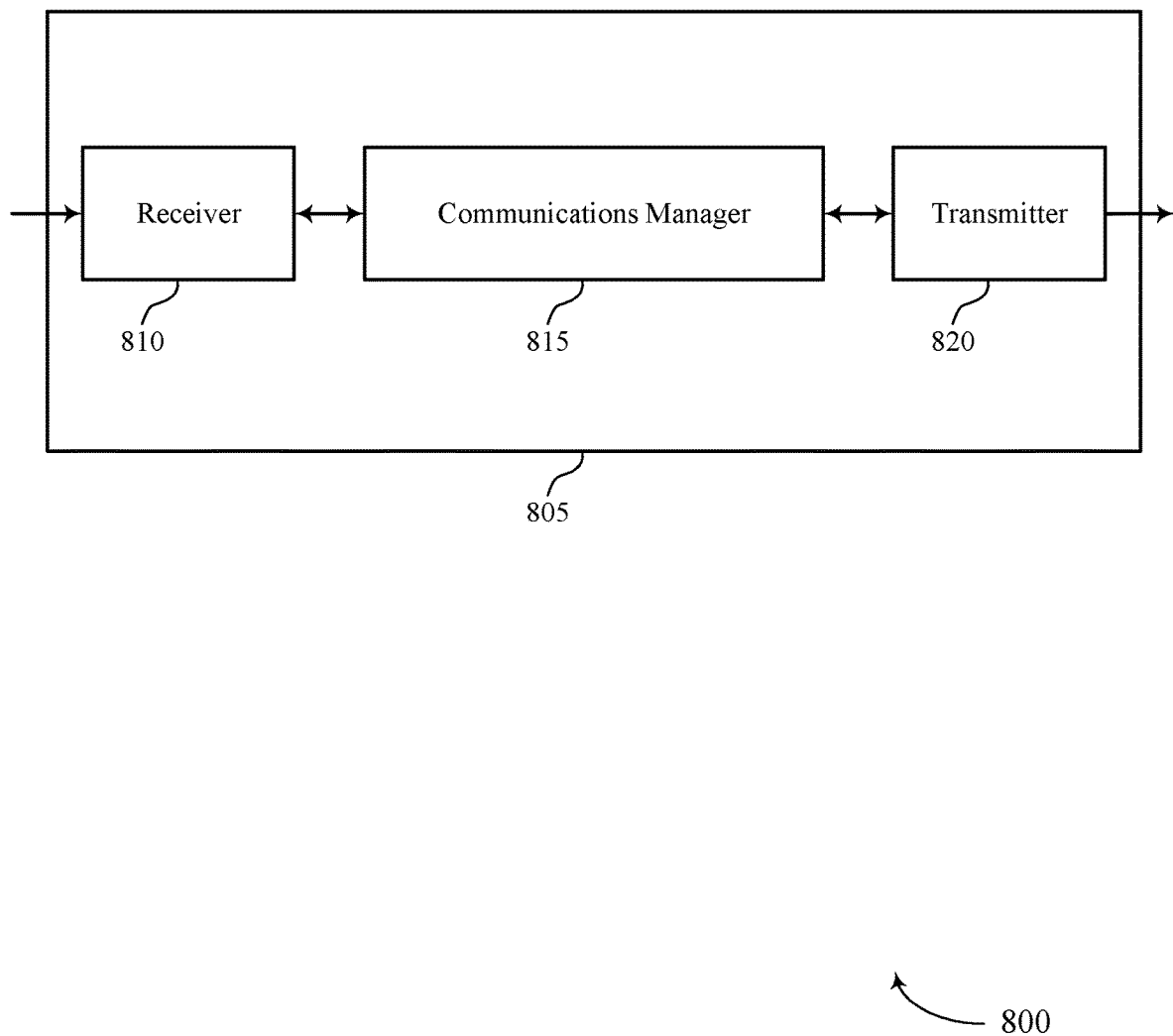
FIGS. 8 and 9 show block diagrams of devices that support eURLLC over-the-air mechanism for shared spectrum in accordance with aspects of the present disclosure.

FIG. 8 shows a block diagram 800 of a device 805 that supports eURLLC over-the-air mechanism for shared spectrum in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to eURLLC over-the-air mechanism for shared spectrum, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station serving the UE in a first network, a power control configuration and a reference signal measurement configuration, receive, based on the reference signal measurement configuration, a reference signal from at least one wireless device of a second network, determine, based on the power control configuration and the received reference signal, an interference level for the second network introduced by the first network, adjust a transmission power limit for the UE based on the determined interference level and the power control configuration, and transmit signals to the base station according to the adjusted transmission power limit. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
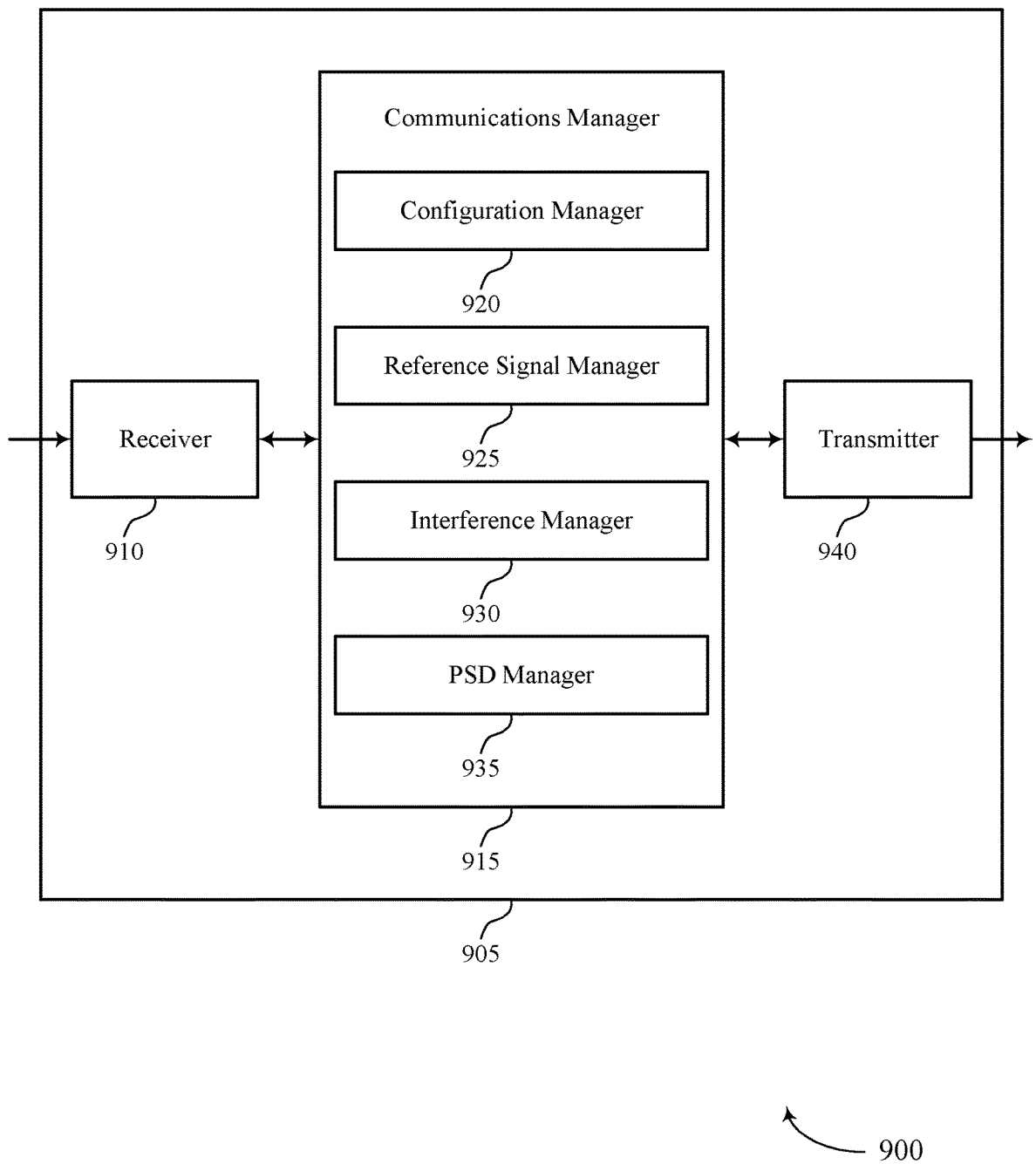

FIG. 9 shows a block diagram 900 of a device 905 that supports eURLLC over-the-air mechanism for shared spectrum in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to eURLLC over-the-air mechanism for shared spectrum, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a configuration manager 920, a reference signal manager 925, an interference manager 930, and a PSD manager 935. The communications manager 915 may be an example of aspects of the communications manager 1110 described herein.

The configuration manager 920 may receive, from a base station serving the UE in a first network, a power control configuration and a reference signal measurement configuration.

The reference signal manager 925 may receive, based on the reference signal measurement configuration, a reference signal from at least one wireless device of a second network.

The interference manager 930 may determine, based on the power control configuration and the received reference signal, an interference level for the second network introduced by the first network and adjust a transmission power limit for the UE based on the determined interference level and the power control configuration.

The PSD manager 935 may transmit signals to the base station according to the adjusted transmission power limit.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
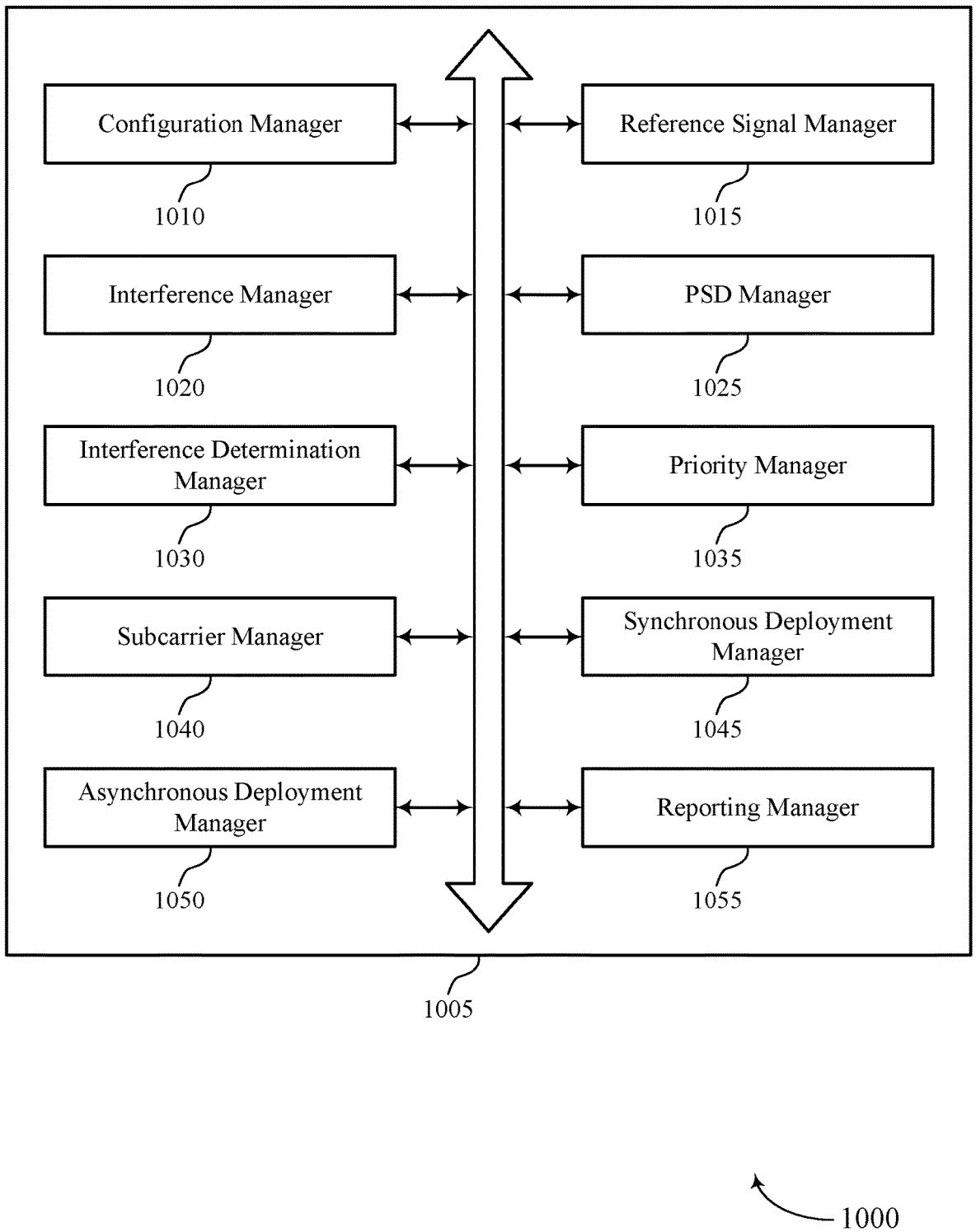
FIG. 10 shows a block diagram of a communications manager that supports eURLLC over-the-air mechanism for shared spectrum in accordance with aspects of the present disclosure.

FIG. 10 shows a block diagram 1000 of a communications manager 1005 that supports eURLLC over-the-air mechanism for shared spectrum in accordance with aspects of the present disclosure. The communications manager 1005 may be an example of aspects of a communications manager 815, a communications manager 915, or a communications manager 1110 described herein. The communications manager 1005 may include a configuration manager 1010, a reference signal manager 1015, an interference manager 1020, a PSD manager 1025, an interference determination manager 1030, a priority manager 1035, a subcarrier manager 1040, a synchronous deployment manager 1045, an asynchronous deployment manager 1050, and a reporting manager 1055. Each of these modules may communicate, directly or indirectly, with one another (e.g., via one or more buses).

The configuration manager 1010 may receive, from a base station serving the UE in a first network, a power control configuration and a reference signal measurement configuration. In some cases, the first network and the second network are associated with a same network operator. In some cases, the first network and the second network are associated with different network operators.

The reference signal manager 1015 may receive, based on the reference signal measurement configuration, a reference signal from at least one wireless device of a second network. In some cases, the at least one wireless device includes a neighbor UE associated with the second network or a neighbor base station associated with the second network. In some cases, the reference signal includes a sounding reference signal or a synchronization signal block.

The interference manager 1020 may determine, based on the power control configuration and the received reference signal, an interference level for the second network introduced by the first network. In some examples, the interference manager 1020 may adjust a transmission power limit for the UE based on the determined interference level and the power control configuration.

The PSD manager 1025 may transmit signals to the base station according to the adjusted transmission power limit. In some cases, the transmission power limit includes a PSD limit for the first network.

The interference determination manager 1030 may determine, based on the received reference signal, an amount of interference to the second network that would be caused by transmissions from the UE according to the power control configuration, where the power control configuration includes an initial transmission power limit of the UE.

In some examples, the interference determination manager 1030 may adjust the initial transmission power limit of the UE based on the amount of interference that would be caused to the second network, where the adjusted transmission power limit of the UE maintains the amount of interference that would be caused to the second network to below a threshold interference level supported by the second network.

The priority manager 1035 may determine that the second network has a higher network priority level than the first network, where adjusting the transmission power limit for the UE is further based on the second network having the higher network priority level.

The subcarrier manager 1040 may detect the reference signal from the at least one of the wireless devices of the second network on at least one of a same subcarrier or on an adjacent subcarrier as a subcarrier of the first network. The synchronous deployment manager 1045 may detect, based on the reference signal measurement configuration, the reference signal during a first reference signal transmission window configured for the second network.

The asynchronous deployment manager 1050 may determine that at least one of the first network, the second network, or a combination thereof, include an asynchronous network, where adjusting the transmission power limit for the UE is further based on the asynchronous network.

The reporting manager 1055 may transmit an indication of the adjusted transmission power limit to the base station serving the UE.

Figure 11:
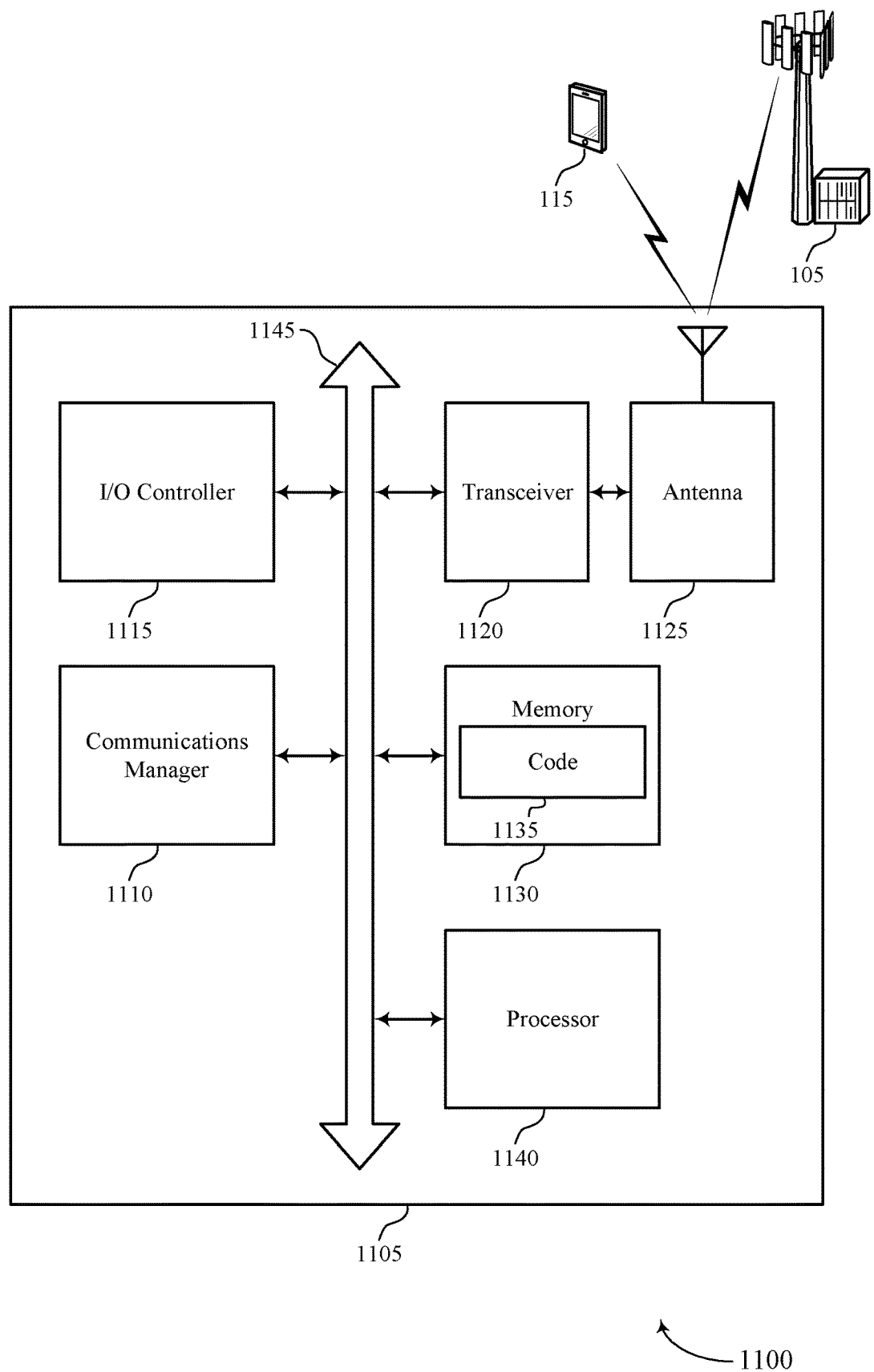
FIG. 11 shows a diagram of a system including a device that supports eURLLC over-the-air mechanism for shared spectrum in accordance with aspects of the present disclosure.

FIG. 11 shows a diagram of a system 1100 including a device 1105 that supports eURLLC over-the-air mechanism for shared spectrum in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station serving the UE in a first network, a power control configuration and a reference signal measurement configuration, receive, based on the reference signal measurement configuration, a reference signal from at least one wireless device of a second network, determine, based on the power control configuration and the received reference signal, an interference level for the second network introduced by the first network, adjust a transmission power limit for the UE based on the determined interference level and the power control configuration, and transmit signals to the base station according to the adjusted transmission power limit.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting eURLLC over-the-air mechanism for shared spectrum).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
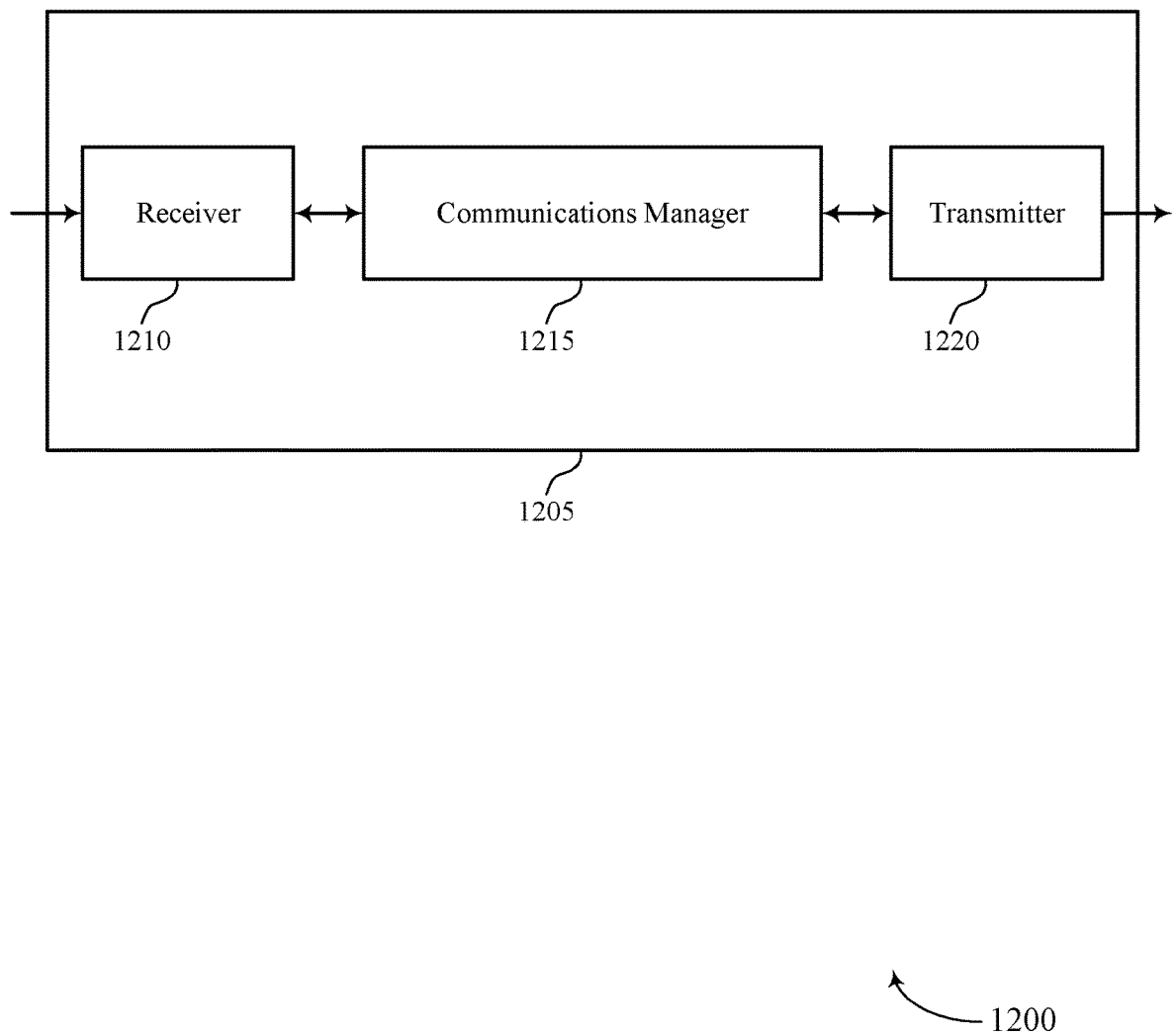
FIGS. 12 and 13 show block diagrams of devices that support eURLLC over-the-air mechanism for shared spectrum in accordance with aspects of the present disclosure.

FIG. 12 shows a block diagram 1200 of a device 1205 that supports eURLLC over-the-air mechanism for shared spectrum in accordance with aspects of the present disclosure. The device 1205 may be an example of aspects of a network device and/or base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to eURLLC over-the-air mechanism for shared spectrum, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a second network that is associated with a priority level higher than the first network, transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network, and receive a measurement report from the UE based on the reference signal measurement configuration. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
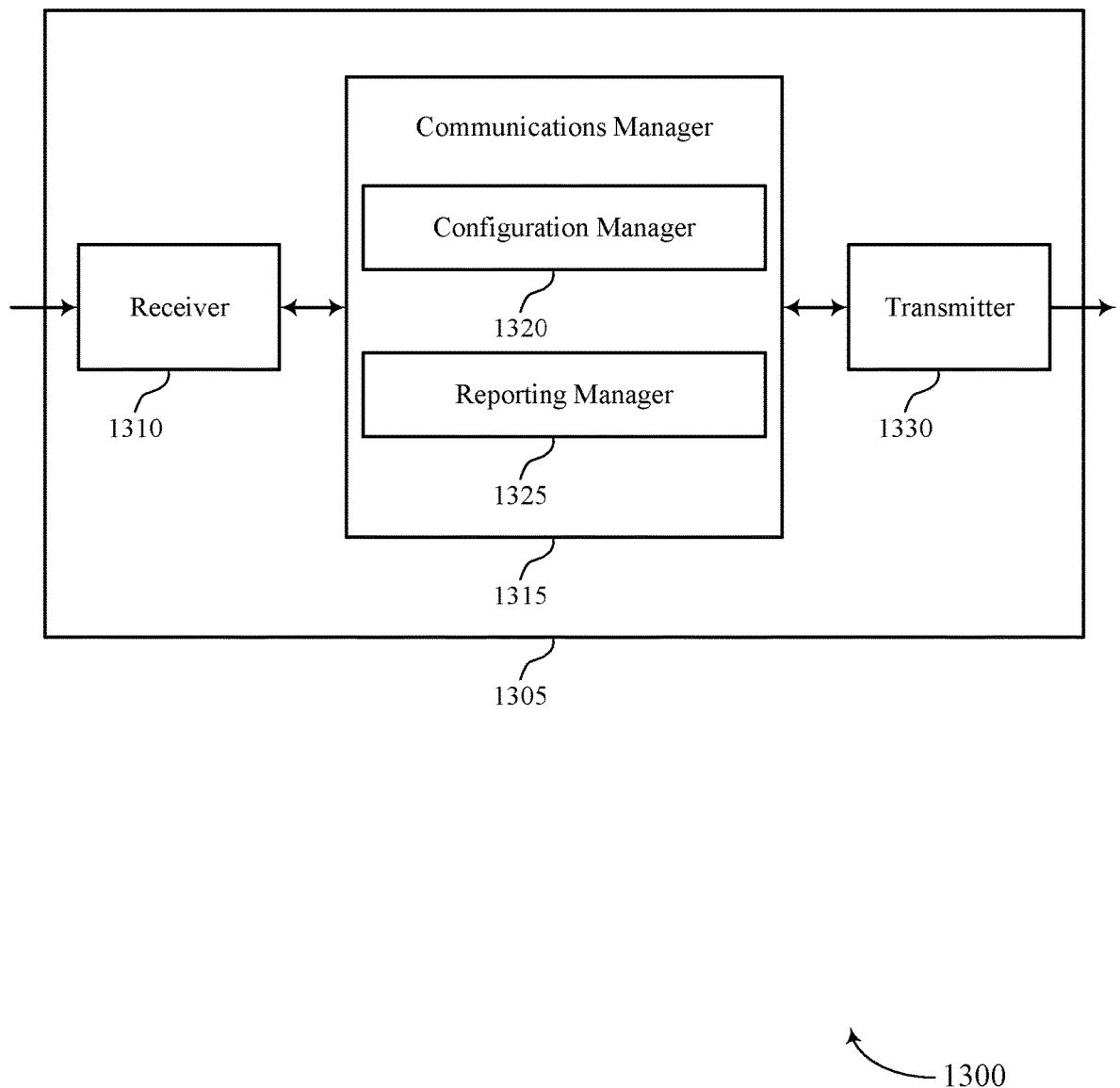

FIG. 13 shows a block diagram 1300 of a device 1305 that supports eURLLC over-the-air mechanism for shared spectrum in accordance with aspects of the present disclosure. The device 1305 may be an example of aspects of a network device, or a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to eURLLC over-the-air mechanism for shared spectrum, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320 and a reporting manager 1325. The communications manager 1315 may be an example of aspects of the communications manager 1510 described herein.

The configuration manager 1320 may identify a second network that is associated with a priority level higher than the first network and transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network.

The reporting manager 1325 may receive a measurement report from the UE based on the reference signal measurement configuration.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
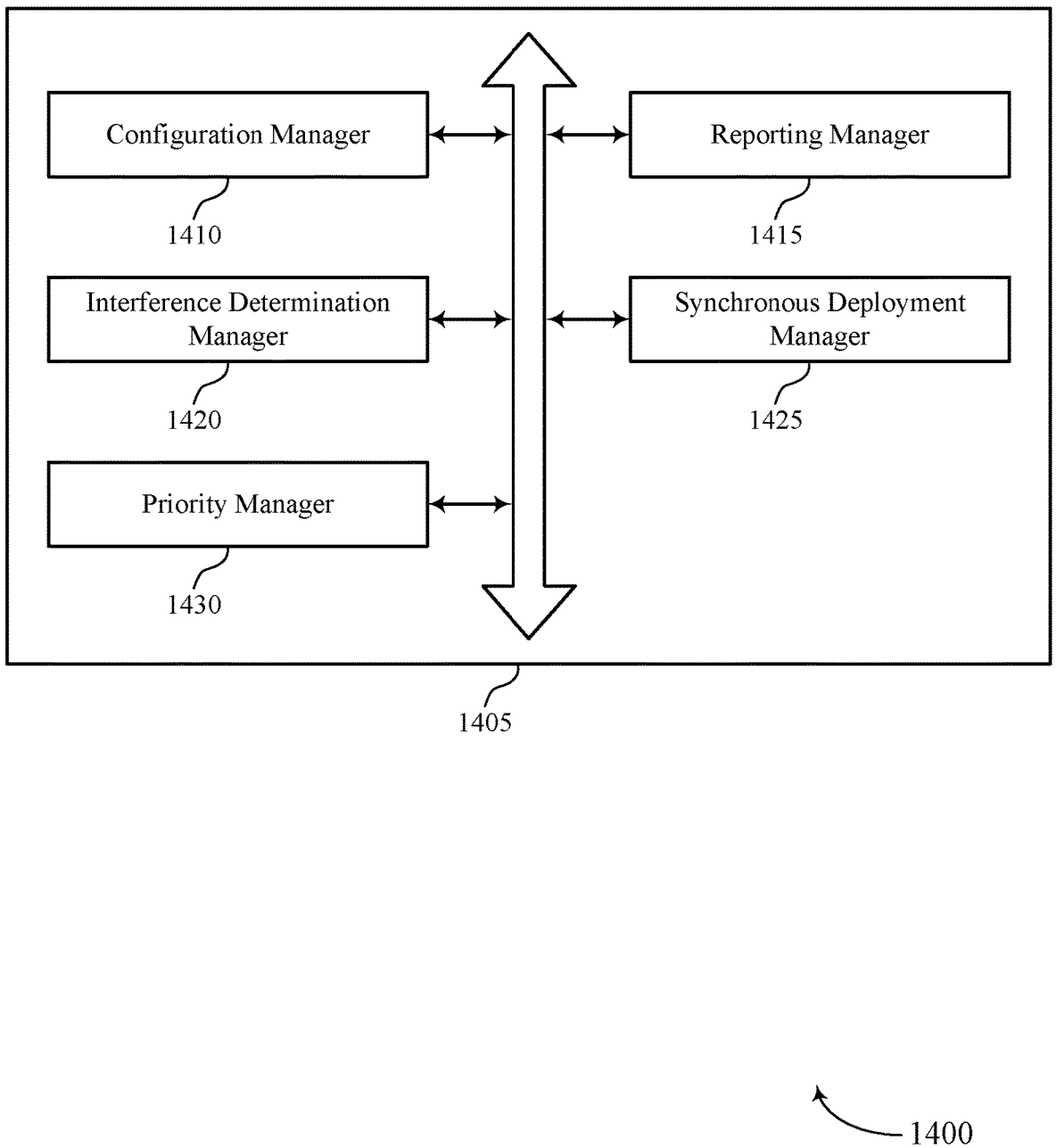
FIG. 14 shows a block diagram of a communications manager that supports eURLLC over-the-air mechanism for shared spectrum in accordance with aspects of the present disclosure.

FIG. 14 shows a block diagram 1400 of a communications manager 1405 that supports eURLLC over-the-air mechanism for shared spectrum in accordance with aspects of the present disclosure. The communications manager 1405 may be an example of aspects of a communications manager 1215, a communications manager 1315, or a communications manager 1510 described herein. The communications manager 1405 may include a configuration manager 1410, a reporting manager 1415, an interference determination manager 1420, a synchronous deployment manager 1425, and a priority manager 1430. Each of these modules may communicate, directly or indirectly, with one another (e.g., via one or more buses).

The configuration manager 1410 may identify a second network that is associated with a priority level higher than the first network.

In some examples, the configuration manager 1410 may transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network. In some cases, the first network and the second network are associated with a same network operator. In some cases, the first network and the second network are associated with different network operators.

The reporting manager 1415 may receive a measurement report from the UE based on the reference signal measurement configuration. In some examples, the reporting manager 1415 may receive an indication of an adjusted transmission power limit from the UE.

The interference determination manager 1420 may receive, based on the reference signal measurement configuration, a reference signal from at least one of the wireless devices of the second network. In some examples, the interference determination manager 1420 may determine, based on the power control configuration and the received reference signal, an interference level for the second network introduced by the first network. In some examples, the interference determination manager 1420 may adjust a transmission power limit of the base station based on the determined interference level. In some examples, the interference determination manager 1420 may transmit signals to the UE according to the adjusted transmission power limit.

The synchronous deployment manager 1425 may determine that at least one of the first network, the second network, or a combination thereof, include a synchronous network. In some examples, the synchronous deployment manager 1425 may determine that resources configured for the second network are unused. In some examples, the synchronous deployment manager 1425 may allocate, based on the synchronous network and the unused resources, the resources for use in the first network.

The priority manager 1430 may determine that the second network is deployed in a geographic area within a threshold range of a coverage area of the first network, where identifying the second network is based on the determining.

Figure 15:
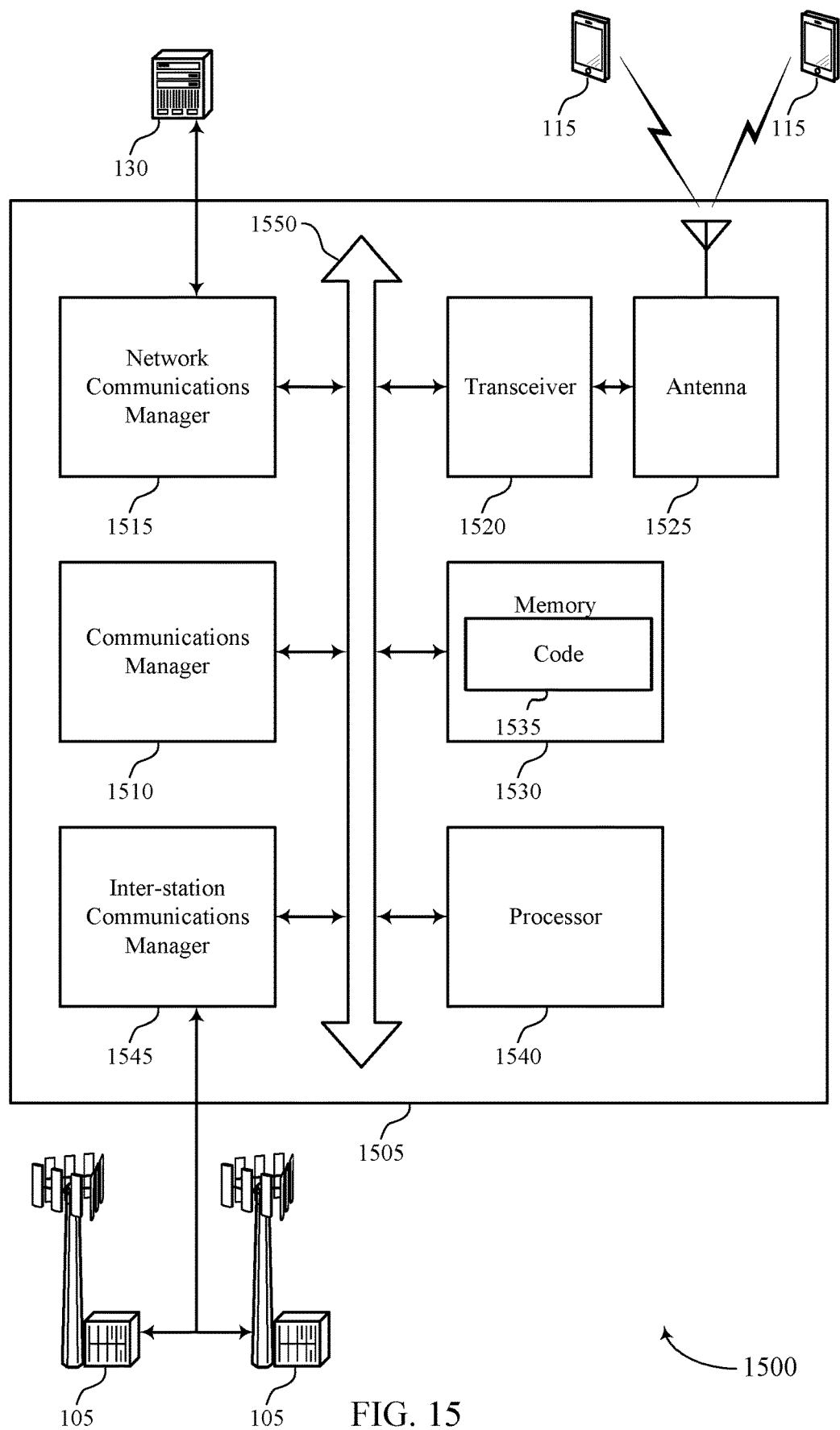
FIG. 15 shows a diagram of a system including a device that supports eURLLC over-the-air mechanism for shared spectrum in accordance with aspects of the present disclosure.

FIG. 15 shows a diagram of a system 1500 including a device 1505 that supports eURLLC over-the-air mechanism for shared spectrum in accordance with aspects of the present disclosure. The device 1505 may be an example of or include the components of network device, device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify a second network that is associated with a priority level higher than the first network, transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network, and receive a measurement report from the UE based on the reference signal measurement configuration.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting eURLLC over-the-air mechanism for shared spectrum).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
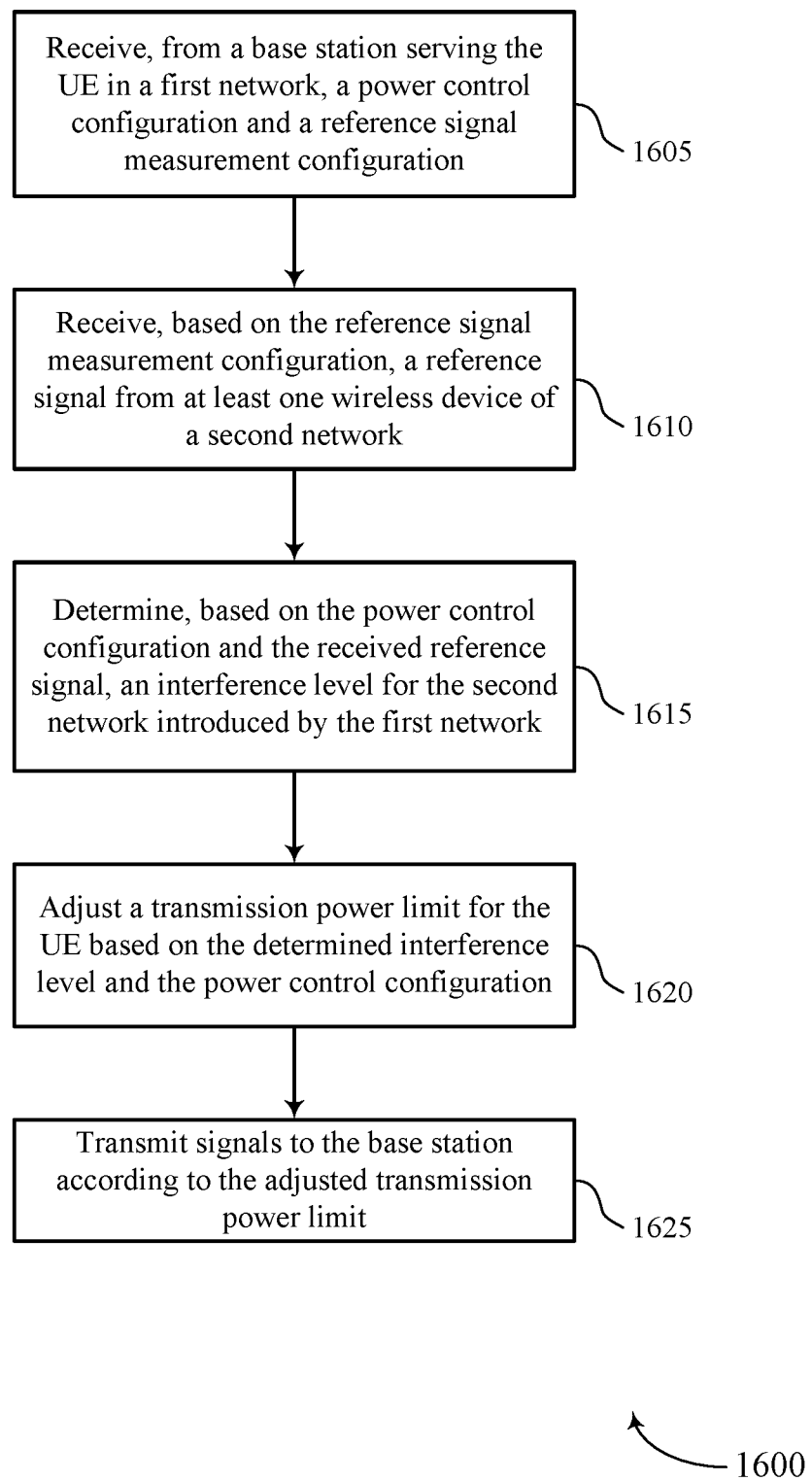
FIGS. 16 through 20 show flowcharts illustrating methods that support eURLLC over-the-air mechanism for shared spectrum in accordance with aspects of the present disclosure.

FIG. 16 shows a flowchart illustrating a method 1600 that supports eURLLC over-the-air mechanism for shared spectrum in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station serving the UE in a first network, a power control configuration and a reference signal measurement configuration. The operations of 1605 may be performed according to the methods described herein. In some examples, aspects of the operations of 1605 may be performed by a configuration manager as described with reference to FIGS. 8 through 11.

At 1610, the UE may receive, based on the reference signal measurement configuration, a reference signal from at least one wireless device of a second network. The operations of 1610 may be performed according to the methods described herein. In some examples, aspects of the operations of 1610 may be performed by a reference signal manager as described with reference to FIGS. 8 through 11.

At 1615, the UE may determine, based on the power control configuration and the received reference signal, an interference level for the second network introduced by the first network. The operations of 1615 may be performed according to the methods described herein. In some examples, aspects of the operations of 1615 may be performed by an interference manager as described with reference to FIGS. 8 through 11.

At 1620, the UE may adjust a transmission power limit for the UE based on the determined interference level and the power control configuration. The operations of 1620 may be performed according to the methods described herein. In some examples, aspects of the operations of 1620 may be performed by an interference manager as described with reference to FIGS. 8 through 11.

At 1625, the UE may transmit signals to the base station according to the adjusted transmission power limit. The operations of 1625 may be performed according to the methods described herein. In some examples, aspects of the operations of 1625 may be performed by a PSD manager as described with reference to FIGS. 8 through 11.

Figure 17:
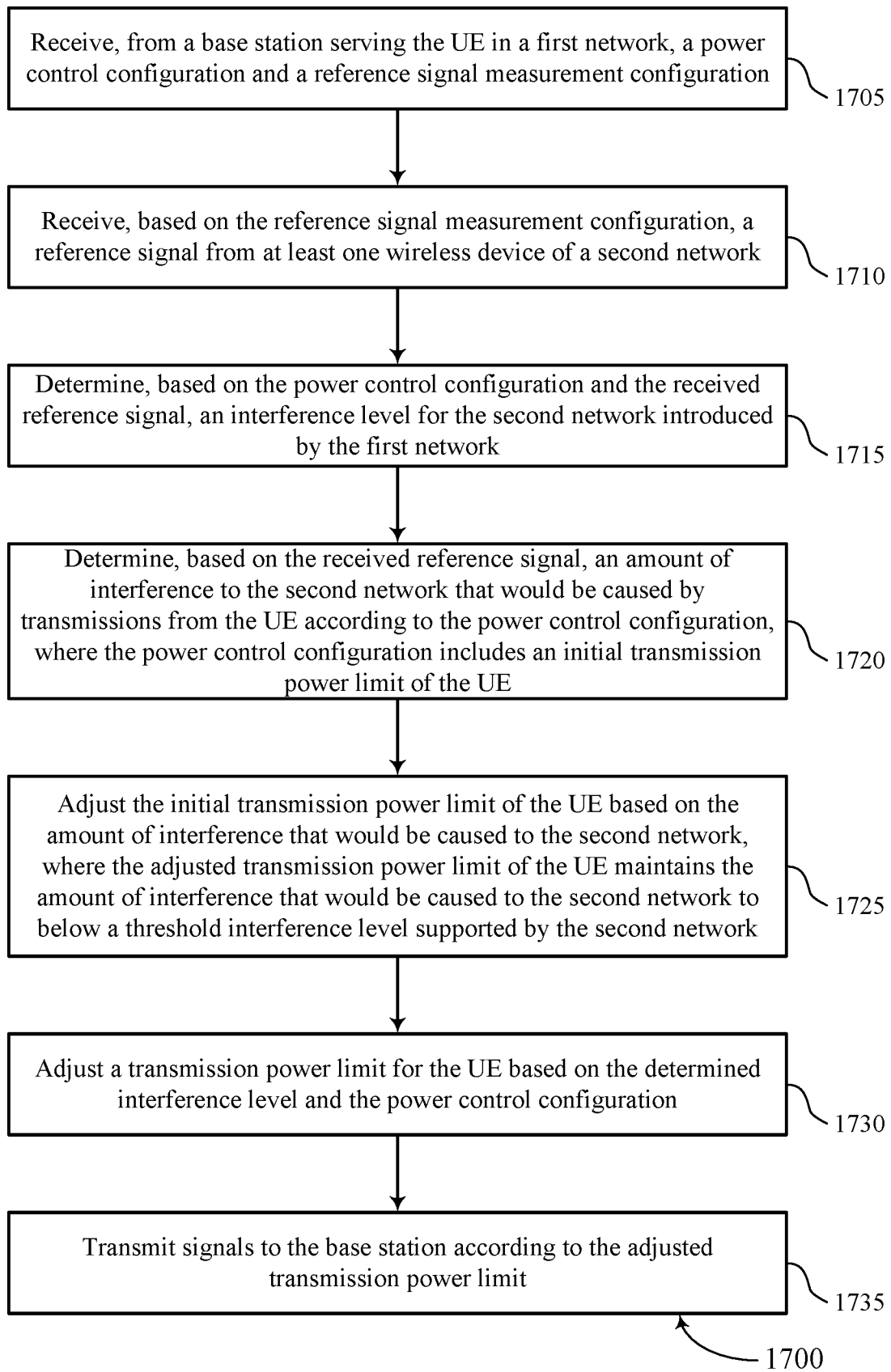

FIG. 17 shows a flowchart illustrating a method 1700 that supports eURLLC over-the-air mechanism for shared spectrum in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station serving the UE in a first network, a power control configuration and a reference signal measurement configuration. The operations of 1705 may be performed according to the methods described herein. In some examples, aspects of the operations of 1705 may be performed by a configuration manager as described with reference to FIGS. 8 through 11.

At 1710, the UE may receive, based on the reference signal measurement configuration, a reference signal from at least one wireless device of a second network. The operations of 1710 may be performed according to the methods described herein. In some examples, aspects of the operations of 1710 may be performed by a reference signal manager as described with reference to FIGS. 8 through 11.

At 1715, the UE may determine, based on the power control configuration and the received reference signal, an interference level for the second network introduced by the first network. The operations of 1715 may be performed according to the methods described herein. In some examples, aspects of the operations of 1715 may be performed by an interference manager as described with reference to FIGS. 8 through 11.

At 1720, the UE may determine, based on the received reference signal, an amount of interference to the second network that would be caused by transmissions from the UE according to the power control configuration, where the power control configuration includes an initial transmission power limit of the UE. The operations of 1720 may be performed according to the methods described herein. In some examples, aspects of the operations of 1720 may be performed by an interference determination manager as described with reference to FIGS. 8 through 11.

At 1725, the UE may adjust the initial transmission power limit of the UE based on the amount of interference that would be caused to the second network, where the adjusted transmission power limit of the UE maintains the amount of interference that would be caused to the second network to below a threshold interference level supported by the second network. The operations of 1725 may be performed according to the methods described herein. In some examples, aspects of the operations of 1725 may be performed by an interference determination manager as described with reference to FIGS. 8 through 11.

At 1730, the UE may adjust a transmission power limit for the UE based on the determined interference level and the power control configuration. The operations of 1730 may be performed according to the methods described herein. In some examples, aspects of the operations of 1730 may be performed by an interference manager as described with reference to FIGS. 8 through 11.

At 1735, the UE may transmit signals to the base station according to the adjusted transmission power limit. The operations of 1735 may be performed according to the methods described herein. In some examples, aspects of the operations of 1735 may be performed by a PSD manager as described with reference to FIGS. 8 through 11.

Figure 18:
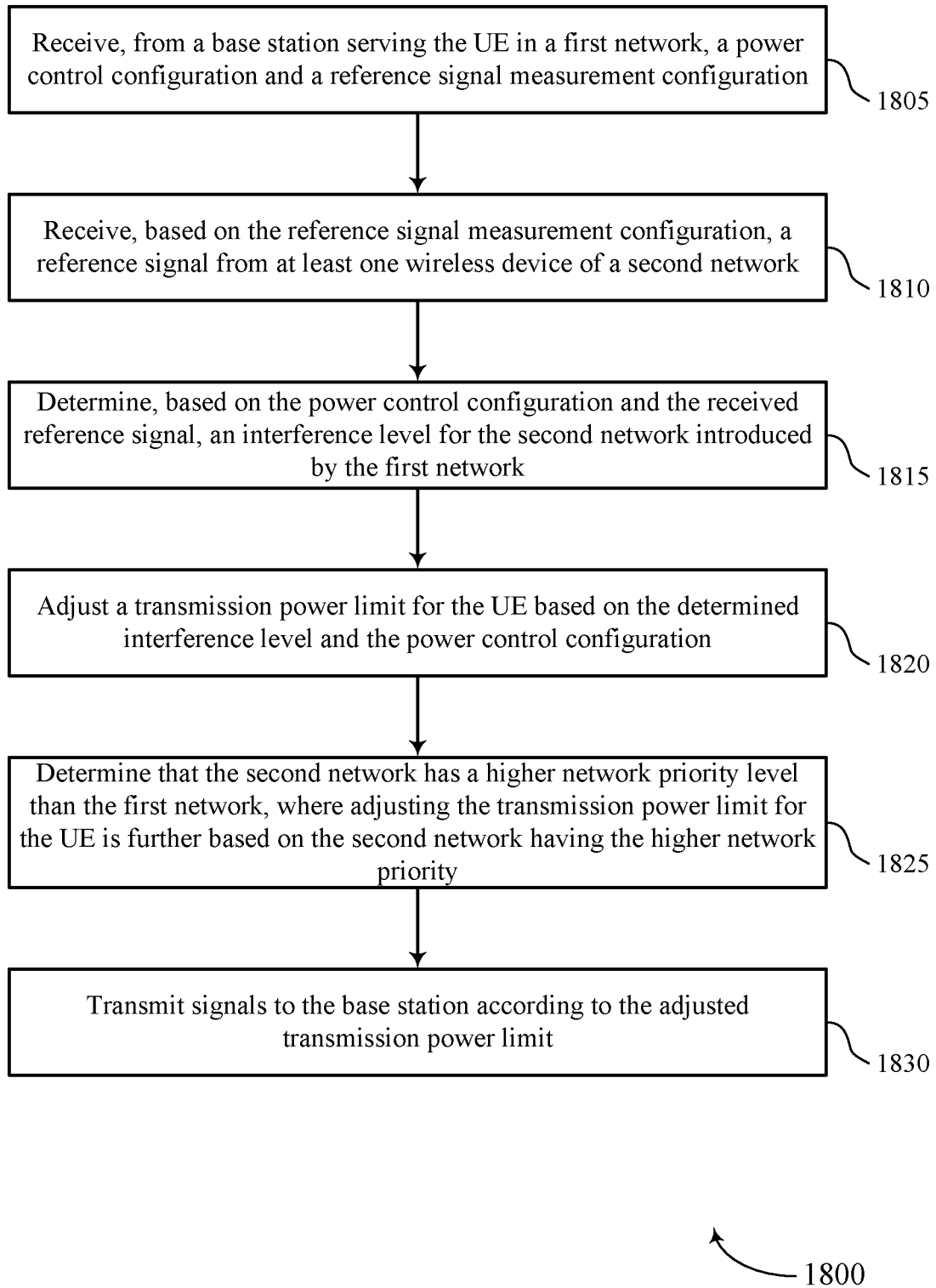

FIG. 18 shows a flowchart illustrating a method 1800 that supports eURLLC over-the-air mechanism for shared spectrum in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station serving the UE in a first network, a power control configuration and a reference signal measurement configuration. The operations of 1805 may be performed according to the methods described herein. In some examples, aspects of the operations of 1805 may be performed by a configuration manager as described with reference to FIGS. 8 through 11.

At 1810, the UE may receive, based on the reference signal measurement configuration, a reference signal from at least one wireless device of a second network. The operations of 1810 may be performed according to the methods described herein. In some examples, aspects of the operations of 1810 may be performed by a reference signal manager as described with reference to FIGS. 8 through 11.

At 1815, the UE may determine, based on the power control configuration and the received reference signal, an interference level for the second network introduced by the first network. The operations of 1815 may be performed according to the methods described herein. In some examples, aspects of the operations of 1815 may be performed by an interference manager as described with reference to FIGS. 8 through 11.

At 1820, the UE may adjust a transmission power limit for the UE based on the determined interference level and the power control configuration. The operations of 1820 may be performed according to the methods described herein. In some examples, aspects of the operations of 1820 may be performed by an interference manager as described with reference to FIGS. 8 through 11.

At 1825, the UE may determine that the second network has a higher network priority level than the first network, where adjusting the transmission power limit for the UE is further based on the second network having the higher network priority level. The operations of 1825 may be performed according to the methods described herein. In some examples, aspects of the operations of 1825 may be performed by a priority manager as described with reference to FIGS. 8 through 11.

At 1830, the UE may transmit signals to the base station according to the adjusted transmission power limit. The operations of 1830 may be performed according to the methods described herein. In some examples, aspects of the operations of 1830 may be performed by a PSD manager as described with reference to FIGS. 8 through 11.

Figure 19:
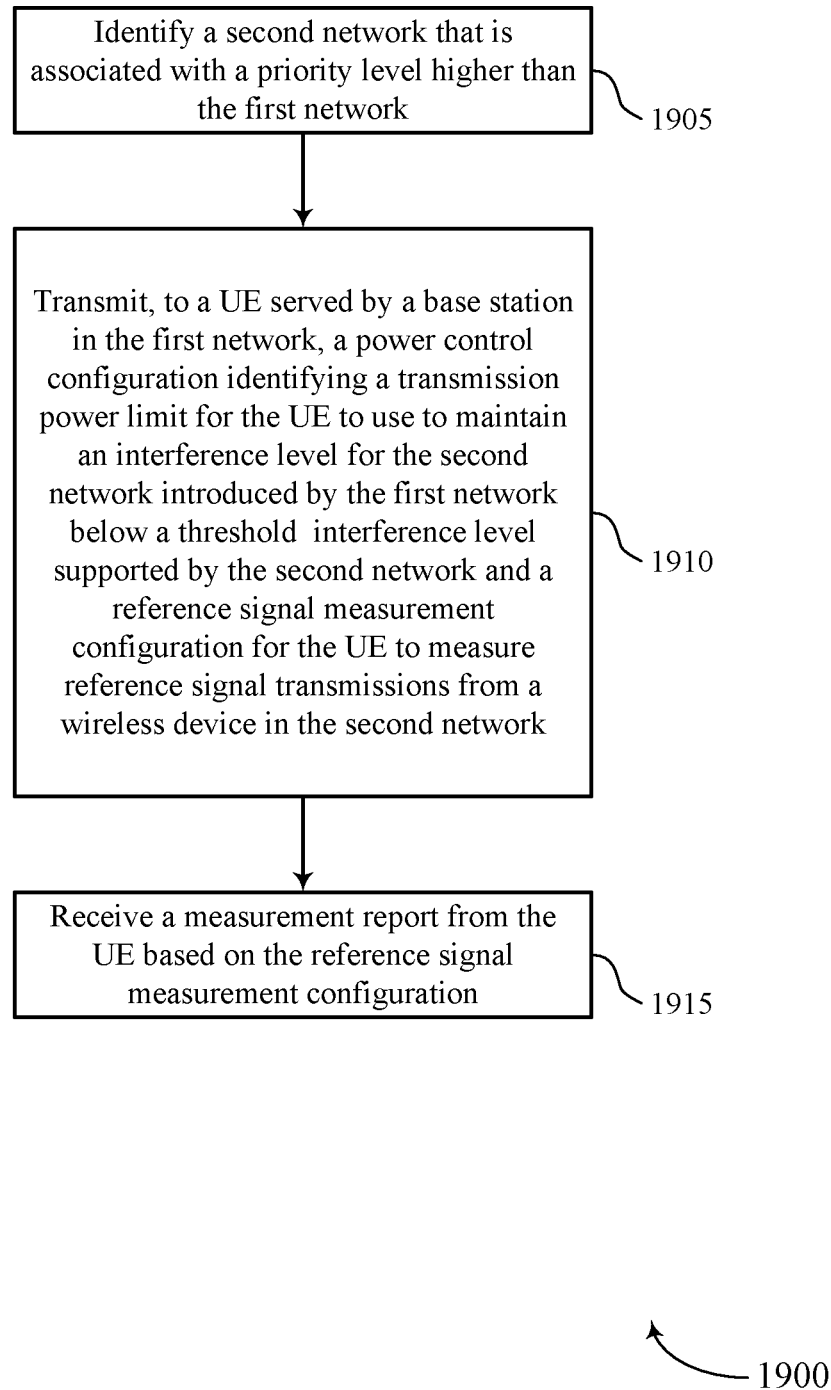

FIG. 19 shows a flowchart illustrating a method 1900 that supports eURLLC over-the-air mechanism for shared spectrum in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may identify a second network that is associated with a priority level higher than the first network. The operations of 1905 may be performed according to the methods described herein. In some examples, aspects of the operations of 1905 may be performed by a configuration manager as described with reference to FIGS. 12 through 15.

At 1910, the base station may transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network. The operations of 1910 may be performed according to the methods described herein. In some examples, aspects of the operations of 1910 may be performed by a configuration manager as described with reference to FIGS. 12 through 15.

At 1915, the base station may receive a measurement report from the UE based on the reference signal measurement configuration. The operations of 1915 may be performed according to the methods described herein. In some examples, aspects of the operations of 1915 may be performed by a reporting manager as described with reference to FIGS. 12 through 15.

Figure 20:
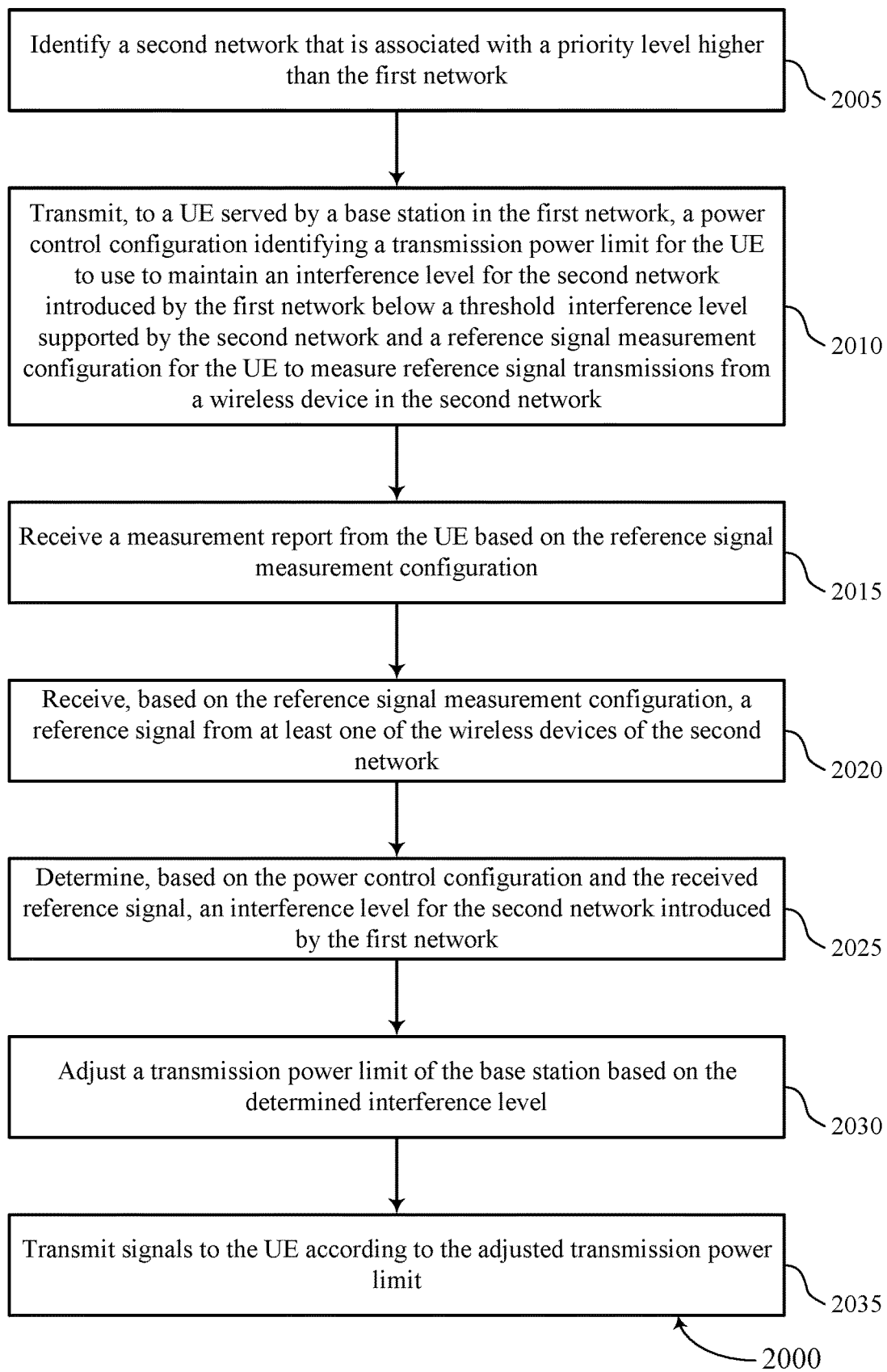

FIG. 20 shows a flowchart illustrating a method 2000 that supports eURLLC over-the-air mechanism for shared spectrum in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may identify a second network that is associated with a priority level higher than the first network. The operations of 2005 may be performed according to the methods described herein. In some examples, aspects of the operations of 2005 may be performed by a configuration manager as described with reference to FIGS. 12 through 15.

At 2010, the base station may transmit, to a UE served by a base station in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network. The operations of 2010 may be performed according to the methods described herein. In some examples, aspects of the operations of 2010 may be performed by a configuration manager as described with reference to FIGS. 12 through 15.

At 2015, the base station may receive a measurement report from the UE based on the reference signal measurement configuration. The operations of 2015 may be performed according to the methods described herein. In some examples, aspects of the operations of 2015 may be performed by a reporting manager as described with reference to FIGS. 12 through 15.

At 2020, the base station may receive, based on the reference signal measurement configuration, a reference signal from at least one of the wireless devices of the second network. The operations of 2020 may be performed according to the methods described herein. In some examples, aspects of the operations of 2020 may be performed by an interference determination manager as described with reference to FIGS. 12 through 15.

At 2025, the base station may determine, based on the power control configuration and the received reference signal, an interference level for the second network introduced by the first network. The operations of 2025 may be performed according to the methods described herein. In some examples, aspects of the operations of 2025 may be performed by an interference determination manager as described with reference to FIGS. 12 through 15.

At 2030, the base station may adjust a transmission power limit of the base station based on the determined interference level. The operations of 2030 may be performed according to the methods described herein. In some examples, aspects of the operations of 2030 may be performed by an interference determination manager as described with reference to FIGS. 12 through 15.

At 2035, the base station may transmit signals to the UE according to the adjusted transmission power limit. The operations of 2035 may be performed according to the methods described herein. In some examples, aspects of the operations of 2035 may be performed by an interference determination manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a network entity serving the UE in a first network, a power control configuration and a reference signal measurement configuration;
receiving, based at least in part on the reference signal measurement configuration, a reference signal from at least one wireless device of a second network;
determining, based at least in part on the power control configuration and the received reference signal, an interference level for the second network introduced by the first network, wherein the second network is associated with a priority level higher than the first network;
adjusting a transmission power limit for the UE based at least in part on the interference level and the power control configuration; and
transmitting signals to the network entity according to the adjusted transmission power limit for the UE; and
receiving, from the network entity, signals having a first adjusted transmission power limit for the network entity, the first adjusted transmission power limit based on the interference level and the priority level.

2. The method of claim 1, wherein determining the interference level comprises:
determining, based at least in part on the received reference signal, an amount of interference to the second network that would be caused by transmissions from the UE according to the power control configuration, wherein the power control configuration comprises an initial transmission power limit of the UE; and
adjusting the initial transmission power limit of the UE based at least in part on the amount of interference that would be caused to the second network, wherein the adjusted transmission power limit of the UE maintains the amount of interference that would be caused to the second network to below a threshold interference level supported by the second network.

3. The method of claim 1, further comprising:
determining that the second network has a higher network priority level than the first network, wherein adjusting the transmission power limit for the UE is further based at least in part on the second network having the higher network priority level.

4. The method of claim 1, further comprising:
detecting the reference signal from the at least one wireless device of the second network on at least one of a same subcarrier or on an adjacent subcarrier as a subcarrier of the first network.

5. The method of claim 1, further comprising:
detecting, based at least in part on the reference signal measurement configuration, the reference signal during a first reference signal transmission window configured for the second network.

6. The method of claim 1, further comprising:
determining that at least one of the first network, the second network, or a combination thereof, comprise an asynchronous network, wherein adjusting the transmission power limit for the UE is further based at least in part on the asynchronous network.

7. The method of claim 1, further comprising:
transmitting an indication of the adjusted transmission power limit to the network entity serving the UE.

8. The method of claim 1, wherein the first network and the second network are associated with a same network operator.

9. The method of claim 1, wherein the first network and the second network are associated with different network operators.

10. The method of claim 1, wherein the at least one wireless device comprises a neighbor UE associated with the second network or a neighbor network entity associated with the second network.

11. The method of claim 1, wherein the reference signal comprises a sounding reference signal or a synchronization signal block.

12. The method of claim 1, wherein the transmission power limit comprises a power spectral density limit for the first network.

13. A method for wireless communication at a network device associated with a first network, comprising:
identifying a second network that is associated with a priority level higher than the first network;
transmitting, to a user equipment (UE) served by a network entity in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network;
receiving a measurement report from the UE based at least in part on the reference signal measurement configuration;
receiving, based at least in part on the reference signal measurement configuration, a reference signal from at least one wireless device of the second network;
determining, based at least in part on the power control configuration and the received reference signal, an interference level for the second network introduced by the first network;
adjusting a transmission power limit of the network entity based at least in part on the interference level; and
transmitting signals to the UE according to the adjusted transmission power limit.

14. The method of claim 13, further comprising:
determining that at least one of the first network, the second network, or a combination thereof, comprise a synchronous network;
determining that resources configured for the second network are unused; and
allocating, based at least in part on the synchronous network and the unused resources, the resources for use in the first network.

15. The method of claim 13, further comprising:
determining that the second network is deployed in a geographic area within a threshold range of a coverage area of the first network, wherein identifying the second network is based at least in part on the determining.

16. The method of claim 13, further comprising:
receiving an indication of an adjusted transmission power limit from the UE.

17. An apparatus for wireless communication at a user equipment (UE), comprising:
a processor,
a memory coupled with the processor, wherein the memory comprises instructions executable by the processor to cause the apparatus to:
receive, from a network entity serving the UE in a first network, a power control configuration and a reference signal measurement configuration;

receive, based at least in part on the reference signal measurement configuration, a reference signal from at least one wireless device of a second network;

determine, based at least in part on the power control configuration and the received reference signal, an interference level for the second network introduced by the first network, wherein the second network is associated with a priority level higher than the first network;

adjust a transmission power limit for the UE based at least in part on the determined interference level and the power control configuration;

transmit signals to the network entity according to the adjusted transmission power limit for the UE;

receive, from the network entity, signals having a first adjusted transmission power limit for the network entity, the first adjusted transmission power limit based on the interference level and the priority level.

18. The apparatus of claim 17, wherein the instructions to determine the interference level are executable by the processor to cause the apparatus to:

determine, based at least in part on the received reference signal, an amount of interference to the second network that would be caused by transmissions from the UE according to the power control configuration, wherein the power control configuration comprises an initial transmission power limit of the UE; and adjust the initial transmission power limit of the UE based at least in part on the amount of interference that would be caused to the second network, wherein the adjusted transmission power limit of the UE maintains the amount of interference that would be caused to the second network to below a threshold interference level supported by the second network.

19. The apparatus of claim 17, wherein the instructions are further executable by the processor to cause the apparatus to:

determine that the second network has a higher network priority level than the first network, wherein adjusting the transmission power limit for the UE is further based at least in part on the second network having the higher network priority level.

20. The apparatus of claim 17, wherein the instructions are further executable by the processor to cause the apparatus to:

detect the reference signal from the at least one wireless device of the second network on at least one of a same subcarrier or on an adjacent subcarrier as a subcarrier of the first network.

21. The apparatus of claim 17, wherein the instructions are further executable by the processor to cause the apparatus to:

detect, based at least in part on the reference signal measurement configuration, the reference signal during a first reference signal transmission window configured for the second network.

22. The apparatus of claim 17, wherein the instructions are further executable by the processor to cause the apparatus to:

determine that at least one of the first network, the second network, or a combination thereof, comprise an asynchronous network, wherein adjusting the transmission power limit for the UE is further based at least in part on the asynchronous network.

23. The apparatus of claim 17, wherein the instructions are further executable by the processor to cause the apparatus to:

transmit an indication of the adjusted transmission power limit to the network entity serving the UE.

24. The apparatus of claim 17, wherein the transmission power limit comprises a power spectral density limit for the first network.

25. An apparatus for wireless communication at a network device associated with a first network, comprising:

a processor, memory coupled with the processor, wherein the memory comprises instructions executable by the processor to cause the apparatus to:

identify a second network that is associated with a priority level higher than the first network;

transmit, to a user equipment (UE) served by a network entity in the first network, a power control configuration identifying a transmission power limit for the UE to use to maintain an interference level for the second network introduced by the first network below a threshold interference level supported by the second network and a reference signal measurement configuration for the UE to measure reference signal transmissions from a wireless device in the second network; and receive a measurement report from the UE based at least in part on the reference signal measurement configuration;

receive, based at least in part on the reference signal measurement configuration, a reference signal from at least one wireless device of the second network;

determine, based at least in part on the power control configuration and the received reference signal, an interference level for the second network introduced by the first network;

adjust a transmission power limit of the network entity based at least in part on the determined interference level; and transmit signals to the UE according to the adjusted transmission power limit.

26. The apparatus of claim 25, wherein the instructions are further executable by the processor to cause the apparatus to:

determine that at least one of the first network, the second network, or a combination thereof, comprise a synchronous network;

determine that resources configured for the second network are unused; and allocate, based at least in part on the synchronous network and the unused resources, the resources for use in the first network.

27. The apparatus of claim 25, wherein the instructions are further executable by the processor to cause the apparatus to:

determine that the second network is deployed in a geographic area within a threshold range of a coverage area of the first network, wherein identifying the second network is based at least in part on the determining.

28. The apparatus of claim 25, wherein the instructions are further executable by the processor to cause the apparatus to:

receive an indication of an adjusted transmission power limit from the UE.

* * * * *